(12) United States Patent
Itzkovitz et al.

(10) Patent No.: US 7,620,391 B2
(45) Date of Patent: Nov. 17, 2009

(54) MANAGEMENT OF MULTIPLE USER IDENTITIES IN A COMMUNICATION SYSTEM

(75) Inventors: Ayal Itzkovitz, Haifa (IL); Tzach Livyatan, Tel-Aviv (IL); Tal Zoller, Haifa (IL)

(73) Assignee: Convergin Israel Ltd., Herzliya (IL)

( * ) Notice: Subject to any disclaimer, the term of this patent is extended or adjusted under 35 U.S.C. 154(b) by 331 days.

(21) Appl. No.: 11/361,839

(22) Filed: Feb. 24, 2006

(65) Prior Publication Data

US 2006/0234690 A1    Oct. 19, 2006

Related U.S. Application Data

(62) Division of application No. PCT/IL2006/000079, filed on Jan. 19, 2006.

(60) Provisional application No. 60/645,024, filed on Jan. 21, 2005.

(51) Int. Cl.
*H04M 3/42* (2006.01)
*H04W 4/00* (2009.01)

(52) U.S. Cl. ............... 455/416; 455/432.1; 455/432.3; 455/433; 455/461

(58) Field of Classification Search ............. 455/435.1, 455/445, 416, 432.1, 432.3, 433, 461
See application file for complete search history.

(56) References Cited

U.S. PATENT DOCUMENTS

| | | | |
|---|---|---|---|
| 5,566,235 A | 10/1996 | Hetz | |
| 6,115,746 A | 9/2000 | Waters et al. | |
| 6,226,373 B1 | 5/2001 | Zhu et al. | |
| 6,661,785 B1 | 12/2003 | Zhang et al. | |
| 6,940,847 B1 | 9/2005 | Glitho et al. | |
| 6,963,583 B1 * | 11/2005 | Foti | 370/467 |
| 6,967,972 B1 | 11/2005 | Volftsun et al. | |

(Continued)

FOREIGN PATENT DOCUMENTS

WO    9921345    4/1999

(Continued)

OTHER PUBLICATIONS

Faynberg, et al, "The Development of the Wireless Intelligent Network (WIN) and Its Relation to the International Intelligent Network Standards", Bell Labs Technical Journal (Summer, 1997), pp. 57-80.

(Continued)

*Primary Examiner*—Barry W Taylor
(74) *Attorney, Agent, or Firm*—Darby & Darby P.C.

(57) ABSTRACT

A computer-implemented method for communication includes assigning to at least first and second communication terminals (22) of a communication system (20) at least respective first and second private identities and a common public identity different from at least the first and second private identities. Registrations of the public identity and of at least the first and second private identities are simultaneously maintained in the communication system (20). A request is received to set up a call in which the public identity serves as one of a source and a destination of the call. The call is established between a third communication terminal and one of at least the first and second communication terminals (22) using the simultaneously-maintained registrations.

32 Claims, 15 Drawing Sheets

U.S. PATENT DOCUMENTS

| | | | |
|---|---|---|---|
| 6,990,124 | B1 | 1/2006 | Dalias et al. |
| 7,161,925 | B2 | 1/2007 | Wallenius et al. |
| 7,447,513 | B2 * | 11/2008 | Anttila et al. ............... 455/519 |
| 7,466,991 | B2 * | 12/2008 | Everson et al. ........... 455/552.1 |
| 2001/0017483 | A1 | 8/2001 | Frohberg |
| 2003/0093563 | A1 * | 5/2003 | Young et al. ................ 709/245 |
| 2004/0006623 | A1 * | 1/2004 | Gourraud et al. ............ 709/227 |
| 2004/0176089 | A1 * | 9/2004 | Sylvain ...................... 455/433 |
| 2004/0204095 | A1 * | 10/2004 | Cyr et al. .................... 455/560 |
| 2004/0246990 | A1 | 12/2004 | Krishnamurthi et al. |
| 2005/0009520 | A1 * | 1/2005 | Herrero et al. ........... 455/435.1 |
| 2006/0105766 | A1 * | 5/2006 | Azada et al. ............. 455/432.1 |
| 2007/0280154 | A1 * | 12/2007 | Gupta et al. ................ 370/328 |

FOREIGN PATENT DOCUMENTS

| | | |
|---|---|---|
| WO | 0042760 | 7/2000 |
| WO | 02/12976 | 2/2002 |

OTHER PUBLICATIONS

Parlay APIs 2.1: Generic Call Control Service Interfaces, Jun. 2000.

Annex B of Standard EN 301 140-1 V1.3.4 (Jun. 1999) of the European Telecommunications Standards Institute (ETSI-Sophia Antipolis, France), entitled "Intelligent Network (IN); Intelligent Network Application Protocol (INAP); Capability Set 2 (CS2); Part 1: Protocol Sepcification".

"Techinical Specification Group Services and System Aspects; IP Multimedia Subsystems (IMS); Stage 2 (Release 7)", 3 GPP TS 23.228, version 7.2.0, Dec. 2005.

Rosenberg et al., RFC 3261, "SIP: Session Initiation Protocol", Jun. 2002.

U.S. Appl. No. 60/645,024, filed Jan. 2005.

Zhu, et al., 2001. "IIN model: modifications and case study". Computer Networks 35(5): 507-519, Dec. 2001.

"Wireless Application Protocol. Wireless Telephony Application Specification". WAPWTA Version 08, Nov. 1999, pp. 36-37.

Perdikeas, et al., 2001. "Parlay-based service engineering in a converged Internet-PSTN environment". Computer Networks 35(5): 565-578, Dec. 2001.

* cited by examiner

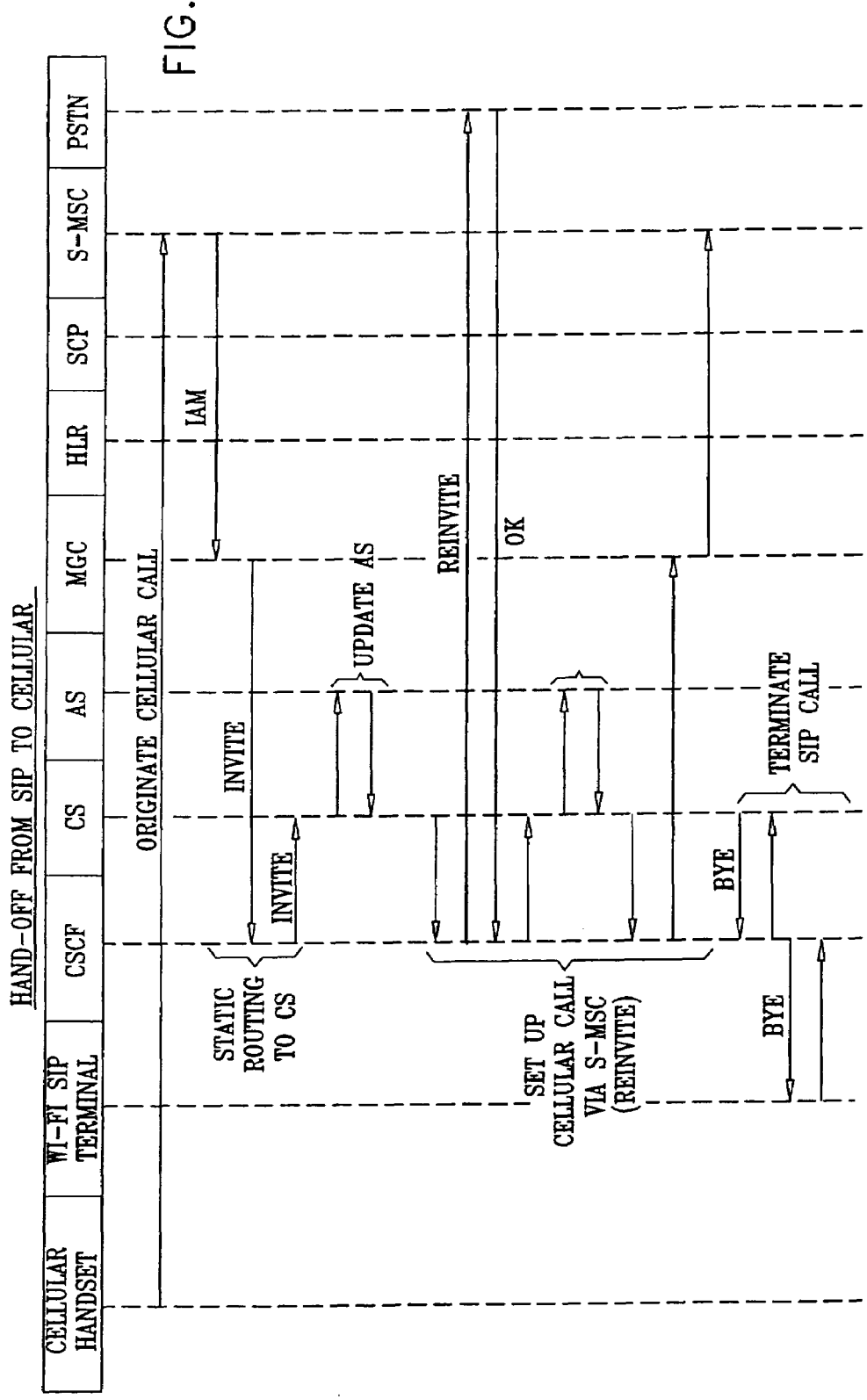

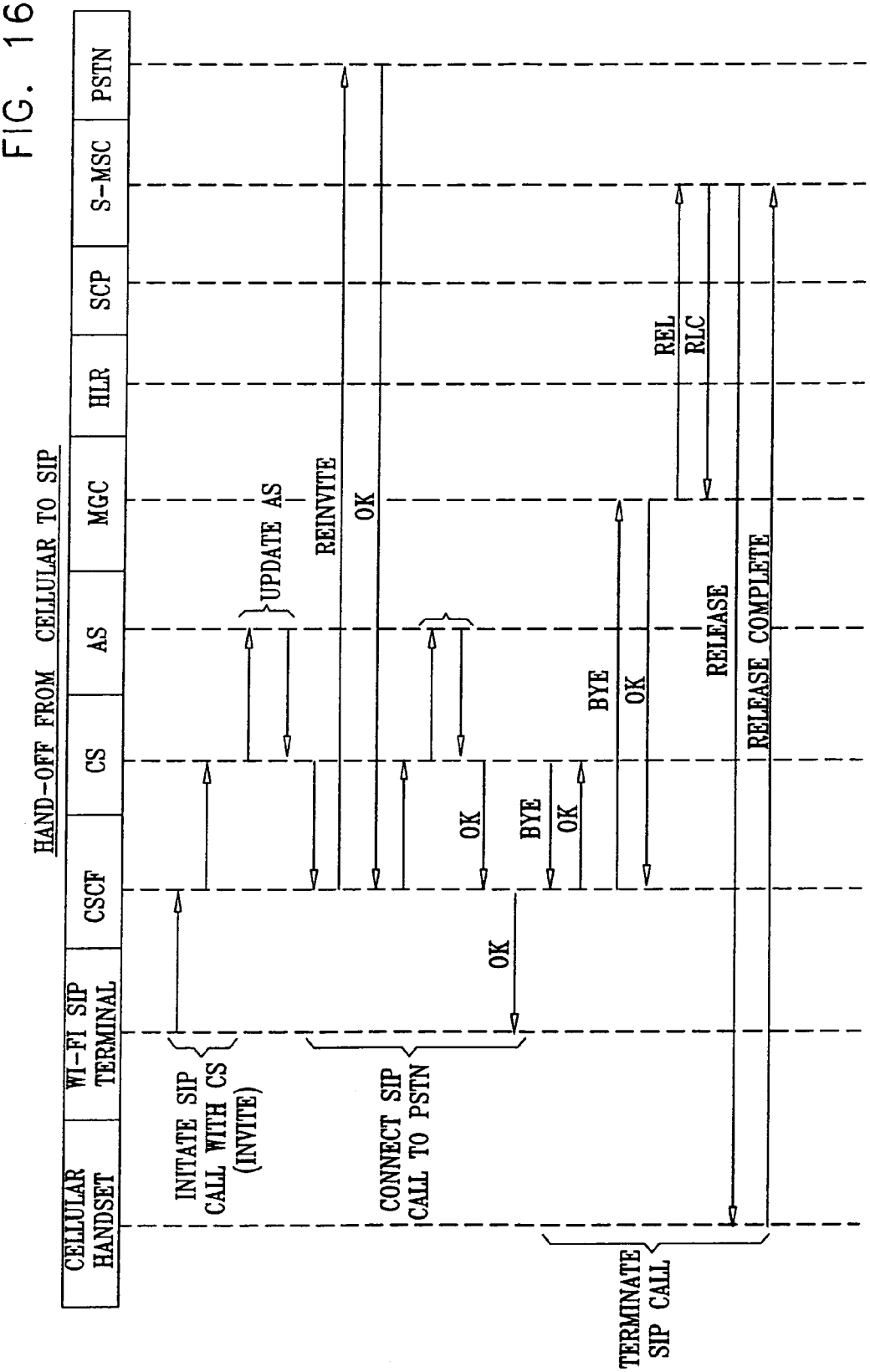

MANAGEMENT OF MULTIPLE USER IDENTITIES IN A COMMUNICATION SYSTEM

CROSS-REFERENCE TO RELATED APPLICATIONS

This application claims the benefit of U.S. Provisional Patent Application 60/645,024, filed Jan. 21, 2005, which is incorporated herein by reference. This application is a division of a U.S. patent application entitled, "Service Convergence Across Multiple Communication Domains," filed on even date, in the national phase of PCT Patent Application PCT/IL2006/000079, filed Jan. 19, 2006.

FIELD OF THE INVENTION

The present invention relates generally to communication networks, and particularly to methods and systems for providing communication services across multiple communication domains.

BACKGROUND OF THE INVENTION

Several concepts and architectures are known in the art for providing communication services over communication networks. For example, the Intelligent Network (IN) is an architectural concept that enables real-time execution of network services and customer applications in a distributed environment of interconnected computers and switching systems, such as wireline and wireless telephone networks. IN standards have been promulgated by the International Telecommunications Union (ITU-T) and by the American National Standards Institute (ANSI). The IN concept is described, for example, by Faynberg et al., in "The Development of the Wireless Intelligent Network (WIN) and Its Relation to the International Intelligent Network Standards," Bell Labs Technical Journal, Summer, 1997, pages 57-80, which is incorporated herein by reference.

Another example of a standardized service provisioning architecture is the Internet Protocol Multimedia Subsystem (IMS) architecture. The IMS architecture is defined and described in a $3^{rd}$ Generation Partnership Project (3GPP) standard entitled "Technical Specification Group Services and System Aspects; IP Multimedia Subsystem (IMS); Stage 2 (Release 7)," 3GPP TS 23.228, version 7.2.0, Dec. 2005. The IP multimedia core network (IM CN) subsystem enables Public Land-Mobile Network (PLMN) operators to offer their subscribers multimedia services based on and built upon Internet applications, services and protocols.

The IMS architecture is described, for example, in a whitepaper published by Lucent Technologies Inc. (Murray Hill, N.J.) entitled "IP Multimedia Subsystem (IMS) Service Architecture," February, 2005, which is incorporated herein by reference.

SUMMARY OF THE INVENTION

In many practical situations, a service provider or other organization operates two or more communication networks conforming to different standards, protocols or access methods. For example, a service provider may operate both wireline and wireless networks, or may be in the process of migrating from a legacy network to a new-generation network. In such applications, it is often desirable to converge and unify the services provided by these networks, as well as the management of subscribers and communication terminals. Embodiments of the present invention provide methods and systems for service-level convergence of communication networks.

In some cases, a subscriber may operate two or more communication terminals, or may operate dual-mode or multi-mode terminals. Methods and systems described herein converge and unify the services provided to subscribers, regardless of the particular terminal or network used to obtain these services. In some embodiments, two or more communication terminals are associated with a common public identity. Each terminal is also associated with a unique private identity. Records that register both public and private identities are maintained simultaneously by the service provider. Calls related to the public identity are then processed using the simultaneously-maintained registration records.

In some embodiments, services carried out by service platforms in different communication networks are invoked and offered to a terminal, regardless of the network affiliation of the terminal. In particular, services carried out by service platforms in networks conforming to different communication domains are invoked and provided during a single call or session.

In some practical scenarios, a circuit-switched network is connected to a packet-switched network. In some embodiments, the convergence methods and systems described herein enable calls arriving over the packet-switched network and addressed to terminals of the circuit-switched network to be routed to their destinations without using any gateway switching elements of the circuit-switched network, such as gateway MSCs. As a result, traffic load and processing tasks are transferred from the circuit-switched network to the packet-switched network and the routing of calls is simplified.

There is therefore provided, in accordance with an embodiment of the present invention, a computer-implemented method for communication, including:

assigning to at least first and second communication terminals of a communication system at least respective first and second private identities and a common public identity different from at least the first and second private identities;

simultaneously maintaining registrations of the public identity and of at least the first and second private identities in the communication system;

receiving a request to set up a call in which the public identity serves as one of a source and a destination of the call; and establishing the call between a third communication terminal and one of at least the first and second communication terminals using the simultaneously-maintained registrations.

In an embodiment, the first communication terminal communicates with a first network conforming to a first communication domain, and the second communication terminal communicates with a second network conforming to a second communication domain different from the first communication domain.

In another embodiment, establishing the call includes invoking a first service platform in the first network to provide a first call service and invoking a second service platform in the second network to provide a second call service, the first and second call services associated with the public identity.

In yet another embodiment, receiving the request includes receiving an incoming call destined to a subscriber associated with the public identity, and establishing the call includes selecting a terminal from among the first and second communication terminals and routing the incoming call to one of the first and second private identities that is assigned to the selected terminal.

In still another embodiment, routing the incoming call includes routing the incoming call to the selected terminal via a convergence server (CS) in the communication system.

Additionally or alternatively, routing the incoming call includes assigning to the received incoming call a first temporary routable number (TRN) associated with the CS in order to cause the incoming call to be routed to the CS. Further additionally or alternatively, routing the incoming call includes assigning to the incoming call routed to the CS a second, TRN so as to cause the incoming call to be routed from the CS to the selected terminal.

In an embodiment, assigning the first TRN includes caching at the CS an association between the first TRN and the public identity and, when the incoming call routed to the CS does not carry the public identity, determining the public identity responsively to the cached association.

In another embodiment, receiving the request includes receiving an outgoing call initiated by an initiating terminal including one of the first and second communication terminals, the outgoing call addressed to a destination, and establishing the call includes routing the outgoing call to the destination via a convergence server (CS) in the communication system.

In yet another embodiment, routing the outgoing call includes replacing in the outgoing call a private identity of the initiating terminal with the public identity.

Additionally or alternatively, routing the outgoing call via the CS includes assigning to the received outgoing call a temporary routable number (TRN) associated with the CS, so as to cause the outgoing call to be routed to the CS, and subsequently routing the outgoing call from the CS to the destination.

Further additionally or alternatively, assigning the TRN includes caching at the CS an association between the assigned TRN and one of the first and second private identities associated with the initiating terminal, and, when the outgoing call routed to the CS does not carry the private identity of the initiating terminal, determining the private identity of the initiating terminal responsively to the cached association.

In an embodiment, establishing the call includes invoking a call service associated with the public identity. In another embodiment, establishing the call includes handing-off the call from the one of the first and second communication terminals to another of the first and second communication terminals.

There is also provided, in accordance with an embodiment of the present invention, a convergence server (CS), including:

a registry, which is arranged to hold an association between at least first and second private identities of at least respective first and second communication terminals and a common public identity different from at least the first and second private identities; and a processor, which is arranged to store in an identity database a registration of the public identity in addition to registrations of at least the first and second private identities stored in the identity database, so as to cause the identity database to simultaneously maintain the registrations of the public identity and of at least the first and second private identities, to receive a request to set up a call in which the public identity serves as one of a source and a destination of the call, and to establish the call between a third communication terminal and one of at least the first and second communication terminals responsively to the association and to the simultaneously-maintained registrations.

There is further provided, in accordance with an embodiment of the present invention, a communication system, including:

an identity database;

at least first and second communication terminals having at least respective first and second private identities registered in the identity database; and a convergence server, which is arranged to assign to at least the first and second communication terminals a common public identity different from at least the first and second private identities, to cause the identity database to simultaneously maintain registrations of the public identity and of at least the first and second private identities, to receive a request to set up a call in which the public identity serves as one of a source and a destination of the call, and to establish the call between a third communication terminal and one of at least the first and second communication terminals responsively to the association and to the simultaneously-maintained registrations.

There is additionally provided, in accordance with an embodiment of the present invention, a computer software product for communication, the product including a computer-readable medium, in which program instructions are stored, which instructions, when read by a computer, cause the computer to hold an association between at least first and second private identities of at least respective first and second communication terminals and a common public identity different from at least the first and second private identities, to store in an identity database a registration of the public identity in addition to registrations of at least the first and second private identities stored in the identity database so as to cause the identity database to simultaneously maintain the registrations of the public identity and of at least the first and second private identities, to receive a request to set up a call in which the public identity serves as one of a source and a destination of the call, and to establish the call between a third communication terminal and one of at least the first and second communication terminals responsively to the association and to the simultaneously-maintained registrations.

There is also provided, in accordance with an embodiment of the present invention, a computer-implemented method for communication in a communication system including a circuit-switched network and a packet-switched network, the method including:

accepting a request to set up a call for a communication terminal associated with one of the circuit-switched network and the packet-switched network;

establishing the call with the one of the circuit-switched network and the packet-switched network responsively to the request; and during the call, invoking a first service platform in the circuit-switched network to provide a first call service, and a second service platform in the packet-switched network to provide a second call service to the communication terminal.

In an embodiment, the circuit-switched network operates in accordance with a signaling system 7 (SS7) protocol.

In another embodiment, the first service platform includes a service control point (SCP) and the first service includes an intelligent network (IN) service.

In yet another embodiment, the packet-switched network includes an Internet Protocol (IP) network, and the second service platform includes a session initiation protocol (SIP) application server (AS).

In still another embodiment, the packet-switched network includes an IP Multimedia Subsystem (IMS) network.

There is additionally provided, in accordance with an embodiment of the present invention, a convergence server, including:

first and second network interfaces, which are respectively arranged to communicate with a circuit-switched network and a packet-switched network; and a processor, which is arranged to accept a request to set up a call for a communication terminal associated with one of the circuit-switched network and the packet-switched network, to establish the call with the one of the circuit-switched network and the packet-switched network responsively to the request and, during the call, to invoke a first service platform in the circuit-switched network to provide a first call service, and a second service platform in the packet-switched network to provide a second call service to the communication terminal.

There is further provided, in accordance with an embodiment of the present invention, a communication system, including:

a circuit-switched network including a first service platform, which is arranged to provide a first call service;

a packet-switched network including a second service platform, which is arranged to provide a second call service; and a convergence server connected to the circuit-switched and packet-switched networks, which is arranged to accept a request to set up a call for a communication terminal associated with one of the circuit-switched network and the packet-switched network, to establish the call with the one of the circuit-switched network and the packet-switched network responsively to the request and, during the call, to invoke the first and second service platforms in order to provide the first and second call services to the communication terminal.

There is also provided, in accordance with an embodiment of the present invention, a computer software product for communication, the product including a computer-readable medium, in which program instructions are stored, which instructions, when read by a computer, cause the computer to communicate with a circuit-switched network including a first service platform arranged to provide a first call service, to communicate with a packet-switched network including a second service platform arranged to provide a second call service, to accept a request to set up a call for a communication terminal associated with one of the circuit-switched network and the packet-switched network, to establish the call with the one of the circuit-switched network and the packet-switched network responsively to the request and, during the call, to invoke the first and second service platforms in order to provide the first and second call services to the communication terminal.

There is additionally provided, in accordance with an embodiment of the present invention, a computer-implemented method for communication over circuit-switched and packet-switched networks, including:

accepting, at a media gateway controller (MGC) connected to the circuit-switched and packet-switched networks, signaling of a call addressed to a destination terminal in the circuit-switched network;

responsively to the signaling, interrogating a home location register (HLR) of the circuit-switched network without using any gateway switching element of the circuit-switched network so as to provide to the MGC routing information enabling routing of the call to a serving switching element of the circuit-switched network that serves the destination terminal; and based on the provided routing information, routing the call using the MGC to the destination terminal via the serving switching element.

In an embodiment, the circuit-switched network includes a mobile circuit-switched network.

In another embodiment, the method includes accepting a media content of the call at a media gateway (MGW) controlled by the MGC and connected to the circuit-switched and packet-switched networks, and routing the call includes causing the MGW to route the media content to the destination terminal via the serving switching element.

In yet another embodiment, interrogating the HLR includes accepting from the HLR a temporary routable number (TRN) associated with the serving switching element, and routing the call includes causing the MGC to route the call to the TRN.

In still another embodiment, the circuit-switched network includes first and second sub-networks including respective first and second HLRs, and interrogating the HLR includes determining one of the first and second sub-networks with which the destination terminal is associated, and interrogating a corresponding one of the first and second HLRs.

In an embodiment, the first sub-network conforms to a first communication protocol and the second sub-network conforms to a second communication protocol different from the first communication protocol.

In another embodiment, interrogating the HLR includes accepting from the HLR an indication of a call service to be provided to the call, and invoking a service platform to provide the call service.

In yet another embodiment, invoking the service platform includes invoking at least one of a service control point (SCP) in the circuit-switched network and an application server (AS) in the packet-switched network.

In still another embodiment, interrogating the HLR includes accepting from the HLR an indication of a call service including a routing operation to be performed on the call, and performing the routing operation responsively to the indication.

There is further provided, in accordance with an embodiment of the present invention, a convergence server, including:

a network interface, which is arranged to communicate with a circuit-switched network, a packet-switched network and a media gateway controller (MGC) connected to the circuit-switched and packet-switched networks; and a processor, which is arranged to interrogate a home location register (HLR) of the circuit-switched network responsively to signaling of a call accepted by the MGC over the packet-switched network, the call addressed to a destination terminal in the circuit-switched network so as to provide to the MGC, without using any gateway switching element of the circuit-switched network, routing information enabling routing of the call to a serving switching element of the circuit-switched network that serves the destination terminal and, based on the provided routing information, to route the call using the MGC to the destination terminal via the serving switching element.

There is also provided, in accordance with an embodiment of the present invention, a communication system, including:

a circuit-switched network;

a packet-switched network;

a media gateway controller (MGC) connected to the circuit-switched and packet-switched networks, which is arranged to accept signaling of a call over the packet-switched network, the call addressed to a destination terminal in the circuit-switched network, and to route the call to the destination terminal; and a convergence server connected to the MGC and to the circuit-switched and packet-switched networks, which is arranged to interrogate a home location register (HLR) of the circuit-switched network responsively to the signaling of the call without using any gateway switching element of the circuit-switched network, so as to provide to the MGC routing information enabling routing of the call to a serving switching element of the circuit-switched network that serves the destination terminal, and, based on the provided routing information, to route the call using the MGC to the destination terminal via the serving switching element.

There is additionally provided, in accordance with an embodiment of the present invention, a computer software product for communication over circuit-switched and packet-switched networks, the product including a computer-readable medium, in which program instructions are stored, which instructions, when read by a computer, cause the computer to interrogate a home location register (HLR) of the circuit-switched network responsively to signaling of a call accepted by a media gateway controller (MGC) over the packet-switched network, the call addressed to a destination terminal in the circuit-switched network, so as to provide to the MGC, without using any gateway switching element of the circuit-switched network, routing information enabling routing of the call to a serving switching element of the circuit-switched network that serves the destination terminal and, based on the provided routing information, to route the call using the MGC to the destination terminal via the serving switching element.

The present invention will be more fully understood from the following detailed description of the embodiments thereof, taken together with the drawings in which:

BRIEF DESCRIPTION OF THE DRAWINGS

FIGS. 15 and 16 are call-flow diagrams that schematically illustrate methods for handing-off calls, in accordance with embodiments of the present invention.

DETAILED DESCRIPTION OF EMBODIMENTS

System Description

Figure 1:
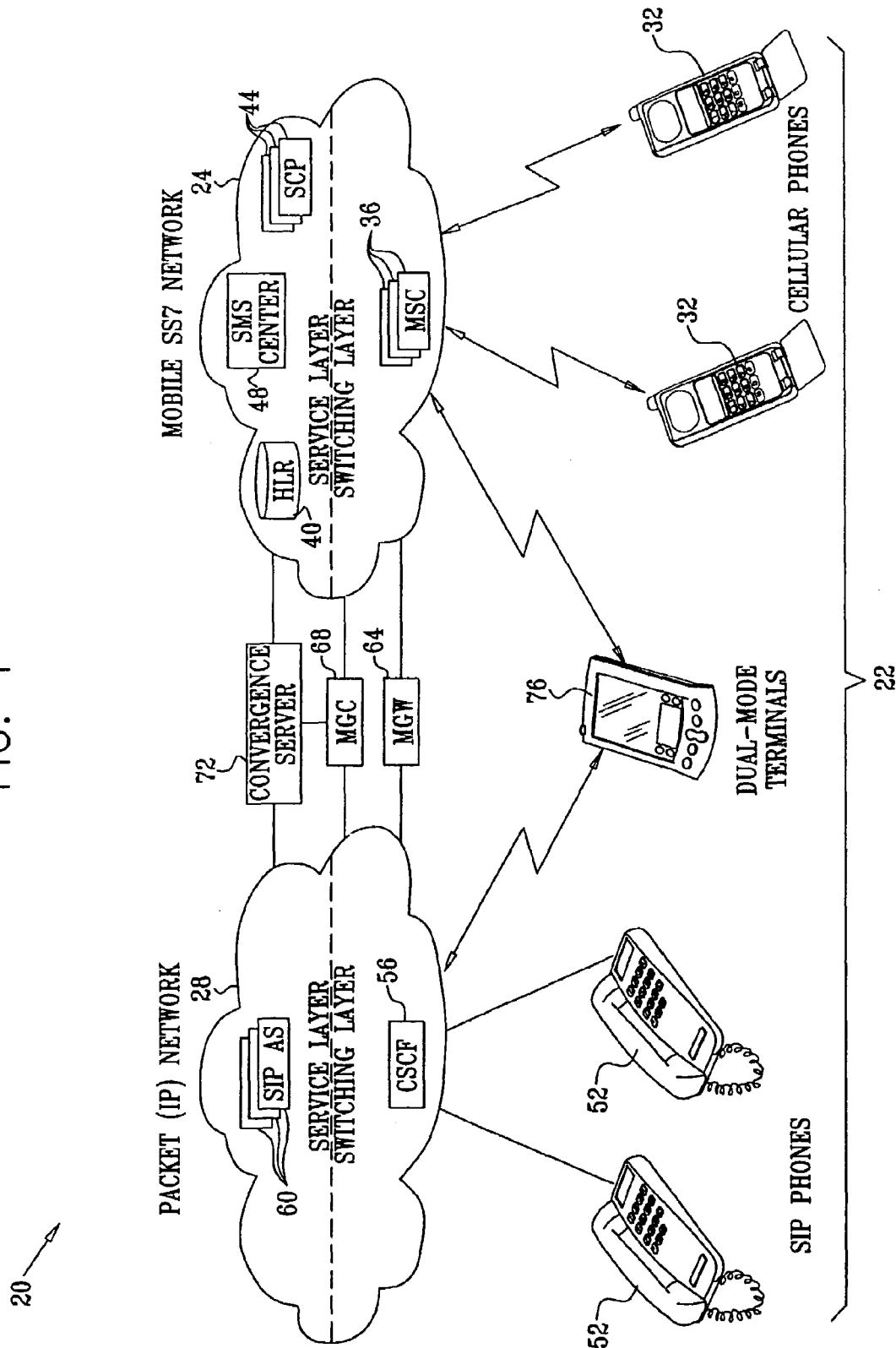
FIG. 1 is a block diagram that schematically illustrates a communication system, in accordance with an embodiment of the present invention.

FIG. 1 is a block diagram that schematically illustrates a communication system 20, in accordance with an embodiment of the present invention. System 20 provides connectivity as well as various communication services to communication terminals 22. System 20 comprises two or more networks conforming to respective communication domains. Each communication domain is characterized by a particular standard, protocol or access method. For example, in the configuration of FIG. 1, system 20 comprises a circuit-switched mobile network 24 and a packet-switched network 28, each viewed as a separate communication domain. Typically, the communication domains of system 20 are different from one another. In some embodiments, however, system 20 may comprise two communication domains conforming to the same standard, protocol or access method.

In alternative embodiments, the communication domains of system 20 may comprise, for example, Wireless Local Area Networks (WLAN), Wi-Fi networks, WiMax Networks, Code Division Multiple Access (CDMA) networks such as CdmaOne, CDMA2000 and EvDo, Global System for Mobile communication (GSM) networks, Universal Mobile Telecommunication System (UMTS) and other third generation (3G) networks, IP Multimedia Subsystem (IMS) networks, wireline networks of different kinds, or any other suitable communication networks. The communication domains may comprise either circuit-switched or packet-switched networks.

System 20 may comprise any number of communication domains, which are typically but not necessarily operated by the same service provider. The methods and systems described hereinbelow enable the service provider to converge and unify the services provided by system 20, as well as to manage the subscribers and terminals across the different communication domains of the system.

Terminals 22 conduct calls via network 20. Although the embodiments described herein refer mainly to voice calls, in the context of the present patent application and in the claims, the term "call" is used in a wider sense to describe any type of communication session with a terminal 22, such as, for example, voice calls, short message service (SMS) messages, multimedia messaging service (MMS) messages, SIP instant messages, IP connections, voice over IP sessions and multimedia sessions.

In the exemplary configuration of FIG. 1, mobile network 24 provides connectivity and services to cellular terminals 32, such as cellular phones, cellular modems and adapters, and/or any other type of cellular terminals. For the sake of simplicity, the description that follows will refer mainly to cellular phones, although the methods and systems described herein can be used in conjunction with any other type of cellular terminals and wireless communication clients.

Cellular phones 32 register with one or more mobile switching centers (MSC) 36, typically via base stations and base station controllers (not shown), as is known in the art. In some cases, a particular MSC may perform the function of a gateway MSC (GMSC) that accept incoming calls from outside of network 24, as a serving MSC (S-MSC) serving a particular phone 32, or both.

A home location register (HLR) 40 serves as the main identity database of network 24. HLR 40 stores subscriber and terminal information, such as the identities of the subscribers and terminals used in system 20. In some embodiments, HLR 40 may store access privileges, service parameters and any additional information related to the subscribers and/or terminals of system 20. As will be shown below, HLR 40 has a central role in determining how calls are routed to and from a particular cellular phone.

In some embodiments, the functions of HLR 40 described herein can be carried out by any other suitable network element comprising an identity database, which is interrogated by incoming and/or outgoing calls. Thus, HLR 40 in this context is an exemplary embodiment of an identity database.

In some embodiments, network 24 provides intelligent network (IN) services, as are known in the art. As such, network 24 comprises one or more service control points (SCP) 44. Generally, each SCP comprises a network element that receives triggers from an MSC or other network element and provides a particular communication service. IN services may comprise, for example, toll-free ("1-800") services, charging/billing services or prepaid services. Network 24 may also comprise additional elements known in the art, such as a short message service (SMS) center 48.

In the exemplary configuration of FIG. 1, the elements of network 24 are interconnected by a circuit-switched public land mobile network (PLMN) operating in accordance with the well-known signaling system 7 (SS7) protocol. Network 24 may be logically divided into a switching layer, which comprises the MSCs, and a service layer, which comprises the HLR, SCPs and SMS center.

Packet network 28 operates in accordance with the well-known session initiation protocol (SIP). Network 28 provides connectivity and communication services to IP terminals 52 such as SIP phones, voice over IP (VoIP) phones, IP multimedia terminals and/or any other type of IP terminals. For the sake of simplicity, the description that follows will refer mainly to SIP phones, although the methods and systems described herein can be used in conjunction with any other type of IP terminal.

In some embodiments, network 28 operates in accordance with the IMS architecture cited above. Like network 24, network 28 can also be logically divided into a switching layer (also referred to as a session control layer) and a service layer. In the switching layer, in accordance with the SIP protocol, a call state control function (SCSF) 56 serves as a database that registers and authenticates SIP phones 52 and handles session control for these phones. Active SIP phones typically register with the CSCF. The CSCF is thus able to provide a routable address, such as an IP address, with which the SIP phone is currently associated. In some embodiments, the CSCF comprises a standalone network element. In alternative embodiments, the functionality of the CSCF can be integrated into other network elements, as will be explained below. In the service layer of network 28, one or more SIP application servers (AS) 60 provide particular communication services.

The two communication domains (networks 24 and 28) are connected by one or more media gateways (MGW) 64 controlled by media gateway controllers (MGC) 68. Media gateways, as are known in the art, are located at the edge of a multi-service packet network and provide media translation between the protocols of disparate networks, such as between networks 24 and 28. For example, in the configuration of FIG. 1, MGW 64 translates the time division multiplexing (TDM) media formats of network 24 into IP-formatted media as required in network 28, and vice versa. MGC 68 (sometimes also referred to as a Softswitch) provides translation of signaling and control protocols between the communication domains. In the example of FIG. 1, MGC 68 translates between the SS7 and SIP protocols used by networks 24 and 28, respectively.

MGW 64 and MGC 68 provide media and control translation, both related to the switching layer of networks 24 and 28. However, in order to provide full service-level unification of the two networks, it is desirable to provide convergence and translation at the service level. These service-level convergence functions are performed by a convergence server (CS) 72, which is connected to networks 24 and 28, and typically also to MGC 68. The internal structure of CS 72, as well as methods for identity management, call processing and service unification carried out using CS 72, are described below.

Although the network configuration of FIG. 1 and some of the method descriptions hereinbelow refer to the service-level convergence of an SS7 network with a SIP network, various other types of communication domains that can be converged will be apparent to those skilled in the art. For example, the methods and systems described herein can be used to provide service-level convergence for dual-mode or multi-mode terminals 76, which support two or more communication domains in a single user terminal. As another example, IP network 28 may comprise a WLAN network that provides services to wireless SIP terminals. Network 24 may comprise, for example, a wireline SS7 network comprising other types of switching elements, such as C4/C5 switches.

Figure 2:
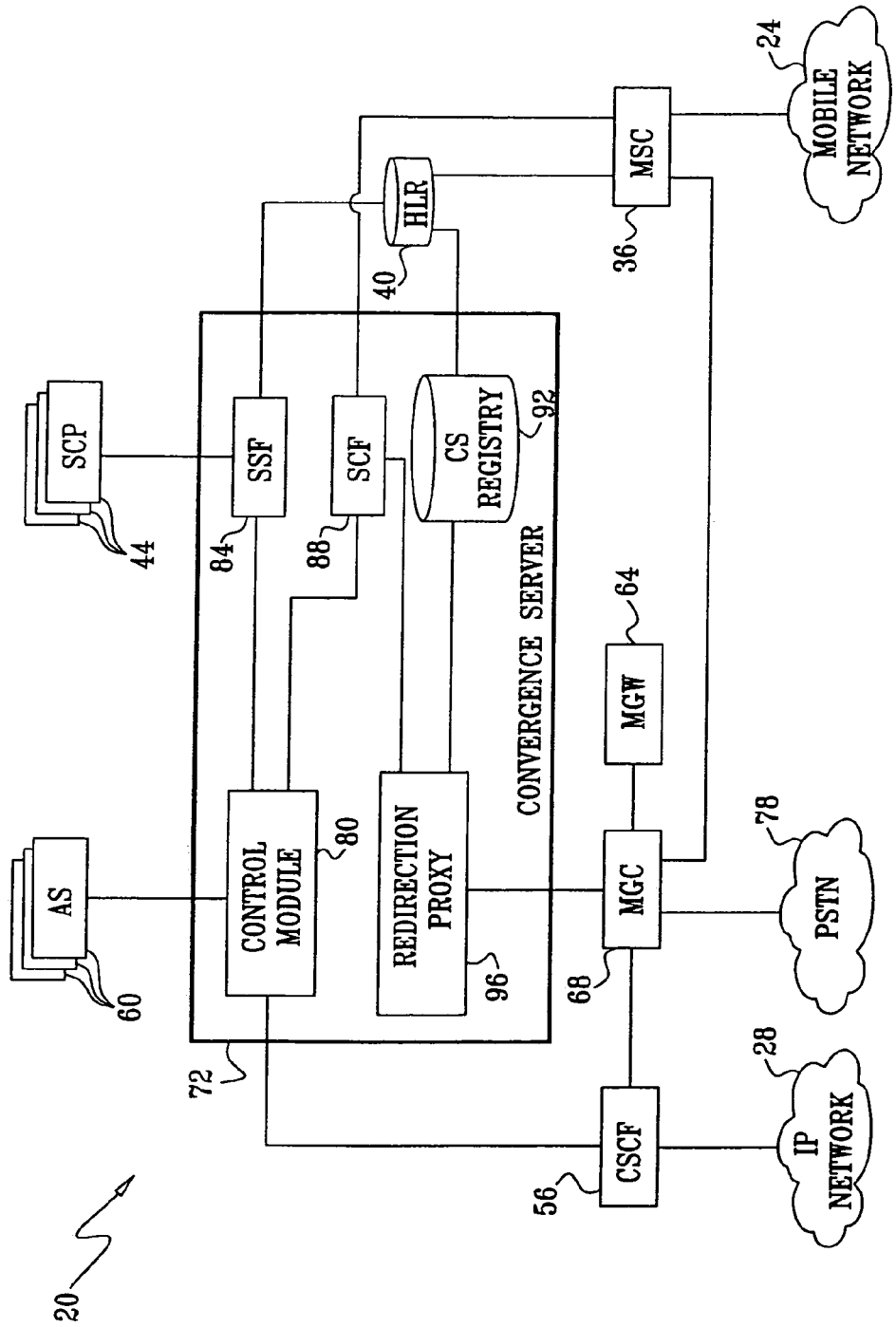
FIG. 2 is a block diagram that schematically illustrates elements of a convergence server, in accordance with an embodiment of the present invention.

FIG. 2 is a block diagram that schematically illustrates elements of convergence server 72 and their interaction with elements of system 20, in accordance with an embodiment of the present invention. In the system configuration of FIG. 2, MGC 68 is also connected to a public switched telephone network (PSTN) 78, from which incoming calls may arrive and to which outgoing calls may be destined. CS 72 comprises a control module 80, which performs the different management and coordination functions of the server. These functions are sometimes referred to as service capability interaction management (SCIM) functions. Module 80 also serves as a network interface for communicating with CSCF 56 and with SIP application servers 60 of network 28. In alternative embodiments, the functions of CSCF 56 may be integrated as part of CS 72 or MGC 68.

A service switching function (SSF) 84 serves as a network interface for communicating with SCPs 44 of network 24. The SSF produces triggers that invoke the different SCPs to provide the required services. In embodiments in which network 24 conforms to the IN architecture, SSF 84 communicates with SCPs 44 using IN application protocol (INAP). SSF 84 also interrogates HLR 40 as part of the call processing methods described below. A service control function (SCF) 88 serves as an interface with MSCs 36 of network 24. Typically, the SCF interacts with the MSCs similarly to a SCP.

CS 72 comprises a CS registry 92, which serves as a visitor location register (VLR) for subscribers of system 20. CS 72 also comprises a redirection proxy 96, which stores contexts of calls processed by CS 72. The roles of registry 92 and proxy 96 will be explained in greater detail in the method descriptions further below.

Typically, convergence server 72 comprises a general-purpose computer, which is programmed in software to carry out the functions described herein. The software may be downloaded to the CS in electronic form, over a network, for example, or it may alternatively be supplied to the computer on tangible media, such as CD-ROM.

Management of Multiple Identities

In many cases, a particular subscriber may own or operate two or more terminals 22 of system 20. For example, the same subscriber may operate a cellular phone 32, a WLAN-enabled laptop computer comprising a software-based voice over IP (VoIP) client and a wireline SIP phone 52, all registered with the service provider of system 20. As another example, a subscriber may use a dual-mode terminal 76, which has both cellular and WLAN functionalities. In the present context, the dual-mode terminal is viewed as two separate terminals 22—a cellular phone 32 and a WLAN terminal—packaged together. Another example of multiple terminals associated with a single subscriber is a multi-mode wireless terminal integrating CDMA, GSM and Wi-Fi terminals.

In general, each of the terminals operated by the subscriber is associated with one of the communication domains of system 20, such as mobile network 24 or packet network 28. The methods and systems described herein converge and unify the services provided by system 20 to the subscriber, regardless of the terminal he or she currently uses to obtain these services.

In particular, it is often desirable that the subscriber be identified to other subscribers by a single identity, regardless of the terminal 22 currently used. This subscriber identity, referred to as a public ID, typically comprises the telephone number by which the subscriber is known (e.g., the number given on the subscriber's business card or a SIP-based Uniform Resource Identifier (URI) address). Thus, incoming calls destined to the subscriber will carry the public ID as the destination of the call. Outgoing calls originating from any of the terminals operated by the subscriber should carry the public ID as the source of the call. The public ID is usually created when the subscriber first signs up with the service provider.

As will be shown below, the public ID carried by outgoing and incoming calls is sometimes used to invoke outgoing call services (O-side services) and/or incoming call services (T-side services) associated with the subscriber. As such, O-side and T-side services are invoked regardless of the terminal 22 used in the call. Additionally, when the recipient of an outgoing call initiated by the subscriber uses caller-ID, the ID displayed will be the public ID. Additionally or alternatively, other actions related to the subscriber and not to a particular terminal 22, such as billing and customer care, are performed using the public ID.

In addition to the subscriber-related public ID, each terminal 22 is uniquely identified by a private ID. In some embodiments, the association between public IDs and private IDs is stored and managed in the convergence server. Alternatively, the association can also be stored and/or managed in a suitable external database accessible to the convergence server. Typically, the private ID comprises a network address of the terminal, in accordance with the technology, standard or protocol of the communication domain in question.

For example, the private ID of a particular cellular phone 32 may comprise an International Mobile Station Identity (IMSI) or International Mobile Equipment Identity (IMEI), as used in GSM and UMTS networks. In an IP network, the private ID of a SIP terminal may comprise a SIP address of the terminal. Other examples of private IDs are Mobile Identification Numbers (MIN) used in some CDMA networks and SIP URIs used in some SIP-based packet networks. The private ID is typically recognized only internally in system 20. Users and/or external elements and networks communicating with the subscriber, as well as the subscriber himself, are usually only aware of the public ID and not of the private IDs.

Figure 3:
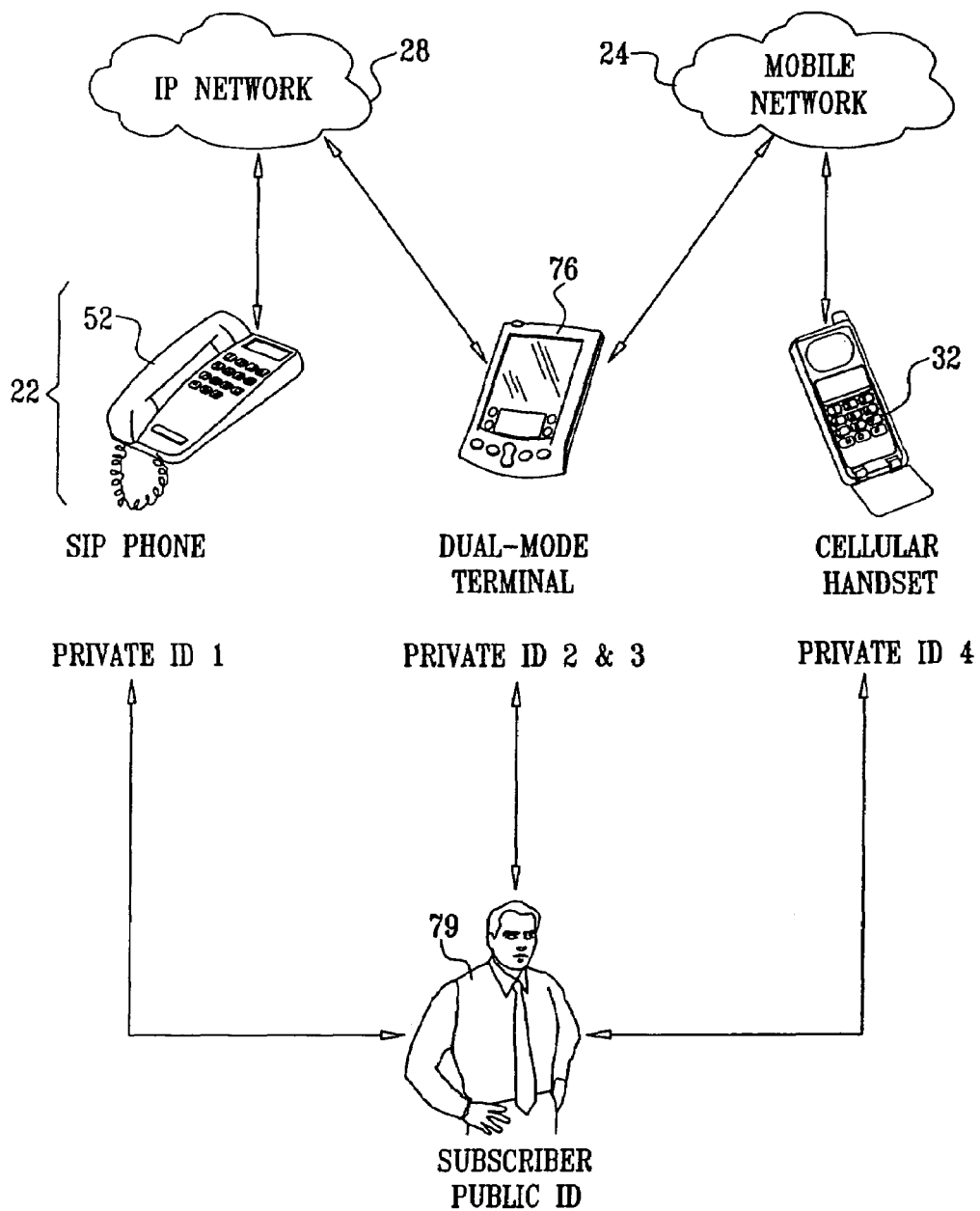
FIG. 3 is a diagram that schematically illustrates public and private identities, in accordance with an embodiment of the present invention.

FIG. 3 is a diagram that schematically demonstrates the concept of public and private identities, in accordance with an embodiment of the present invention. A subscriber 79 is identified by a public ID. In the present example, subscriber 79 uses three terminals 22. SIP phone 52 used by subscriber 79 is associated with packet network 28 and is identified by a private ID denoted PRIVATE ID1. Subscriber 79 also operates a dual-mode terminal 76, which may communicate with both mobile network 24 and packet network 28. The cellular terminal in dual-mode terminal 76 is identified by a private ID denoted PRIVATE ID2, whereas the SIP terminal in the dual-mode terminal is identified by a private ID denoted PRIVATE ID3. Cellular handset 32 used by subscriber 79 is associated with mobile network 24 and is identified by a private ID denoted PRIVATE ID4. All four private IDs are associated with the same public ID.

The private IDs of terminals 32 of network 24 that are currently accessible in network 24 are registered in HLR 40. The private IDs of terminals 52 that are currently accessible in network 28 are typically stored in a database accessible to the convergence server, such as in a network-specific registry in network 28 or in registry 92, as will be described below. An exemplary network-specific registry may comprise a home subscriber server (HSS) used in IMS networks. In general, the record registering the private ID points to a network location where information for accessing the corresponding terminal 22 is available. When terminal 22 belongs to mobile network 24, the record points to the MSC that currently serves this terminal. When terminal 22 belongs to packet network 28 the record points to CSCF 56.

In addition, the public ID related to the subscriber is registered in HLR 40 using a record that points to convergence server 72. The record registering the public ID in the HLR defines CS 72 (or, more accurately, registry 92 of CS 72) as the VLR of the public ID. In other words, CS 72 is configured as the serving MSC(S-MSC) of all public IDs. Exemplary registration processes, in which the appropriate registration records are created and stored, are described in FIGS. 4 and 5 below.

Thus, when an incoming call carrying a certain public ID arrives, the HLR routes the call to CS 72, as indicated by the record corresponding to this public ID. In some cases, when the incoming call is destined to a public ID in the form of a SIP URI address, the call will be routed to the CS 72 via CSCF 56. CS 72 selects the private ID to which the call should be routed, and performs the appropriate routing. An exemplary method for processing incoming calls is described in detail in FIG. 6 below. The method description includes several exemplary criteria and logic, which may be applied by CS 72 for selecting the private ID.

When an outgoing call is initiated by one of the terminals associated with a certain public ID, the call is routed to CS 72. CS 72 replaces the private ID carried by the call with the public ID and routes the call to its destination. An exemplary method for processing outgoing calls is described in detail in FIG. 7 below.

Unlike some known identity management methods in which only one private identity is registered (i.e., active) at any given time, in the methods and systems described herein all private IDs associated with a particular public ID can be active simultaneously. The simultaneous availability of multiple private IDs provides several advantages.

For example, a hand-off process from one private ID to another (i.e., the process of transferring an active call from one terminal to another) is quick and smooth, in comparison to known hand-off procedures. In some embodiments, when simultaneous private identities are active simultaneously, the corresponding terminals 22 are also kept active. Therefore, unlike known hand-off procedures, there is no need to perform terminal initialization as part of the hand-off process. Additionally, there is no need to deregister one private ID and to register another private ID in the HLR or to qualify the terminal with the HLR. Furthermore, the hand-off procedure can be made transparent to the service platforms (e.g., SIP AS and/or SCP) involved in the call. Since there is no need to register and deregister the private IDs, the signaling load handled by HLR 40 is reduced. Exemplary hand-off procedures that use simultaneously-active private identities are described in FIGS. 15 and 16 below.

The simultaneous availability of private IDs enables CS 72 to exercise different rules or policies when deciding to which terminal an incoming call is to be routed. For example, in some embodiments it is possible to send an indication of the call (e.g., session/call ring) to all terminals 22 associated with the public ID, not only to the terminal selected to accept the call. As another example, different call/session types can be routed to appropriate terminal types. For example, when one communication domain of system 20 comprises a cellular network and another domain comprises a data network (e.g., EvDO or WiFi) that does not support voice media, voice calls can be routed to a terminal of the cellular network, while messaging calls can be routed to a terminal of the data network, assuming both terminals are associated with the same public ID.

Registration Method Descriptions

Figure 4:
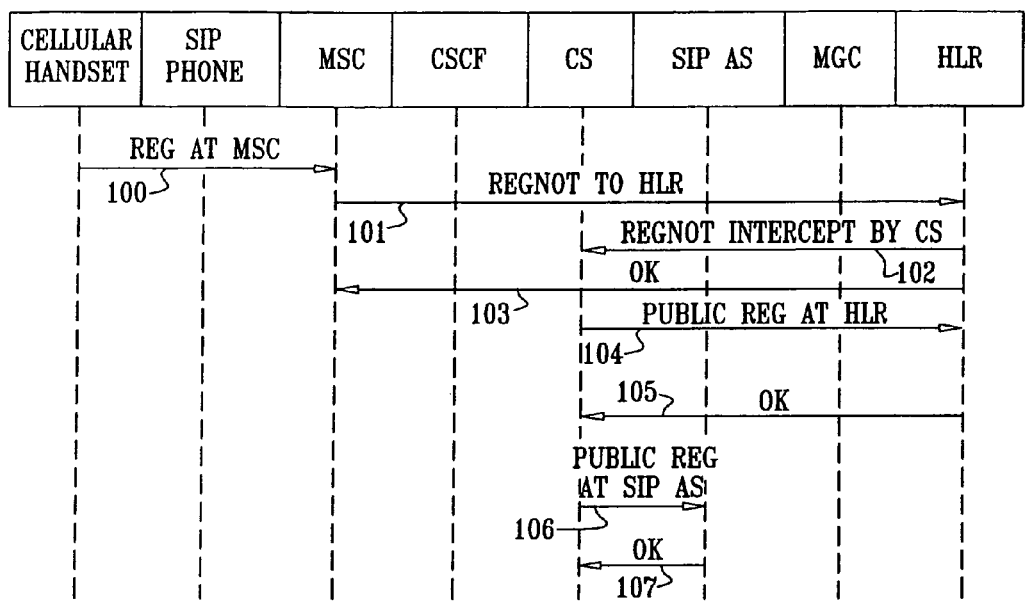
FIG. 4 is a call-flow diagram that schematically illustrates a method for registration with a mobile network, in accordance with an embodiment of the present invention.

FIG. 4 is a call-flow diagram that schematically illustrates a method for registering a cellular phone 32 in mobile network 24, in accordance with an embodiment of the present invention. The call flow examples given below use the terminology of the IS-41 network standard, which is typical of US cellular networks such as CDMA. Call flows that use similar principles can be defined for any other suitable network standard, such as GSM.

The registration method begins with cellular phone 32 being turned on inside the coverage area of mobile network 24, or otherwise attempting to join the mobile network. Phone 32 first registers with one of MSCs 36 using its private ID, at a phone MSC registration step 100. The MSC with which the phone registers is referred to as the serving MSC, or S-MSC, of this phone.

The serving MSC sends a registration notification (REG-NOT) message comprising the phone's private ID to HLR 40, at a phone HLR registration step 101. The registration notification message of step 101, carrying the private ID, is also received by convergence server 72, at a registration interception step 102. In some embodiments, the CS monitors the registration messages using a passive probe mechanism or using a proxy mechanism, as are known in the art. A proxy mechanism typically comprises using an active element acting as an HLR towards the MSCs and as an MSC towards the HLR. Steps 102, 104 and 105 below are optional and applicable when probing/proxy methods are used. Otherwise, registration of the public ID in step 104 below is performed as a static or periodic provisioning process.

If the registering phone 32 is authorized by HLR 40, the HLR creates and stores a record comprising the private ID of the cellular phone and pointing to the serving MSC. The HLR then sends a registration approval message to the serving MSC, at a HLR MSC approval step 103. The approval message typically comprises service parameters to be used for this terminal. In particular, the approval message notifies the MSC that CS 72 is to be used as SCP for this terminal.

In some embodiments, after receiving the registration notification message at step 102 above, control module 80 of CS 72 retrieves from registry 92 the public ID that corresponds to the private ID carried by the notification message. CS 72 then sends a registration notification message to HLR 40, at a cellular CS HLR registration step 104. The message requests the HLR to register the public ID with a record pointing to the CS (i.e., requesting to define the CS as the VLR of the public ID).

In an alternative embodiment, CS HLR registration step 104 is performed only after HLR 40 authorizes the terminal and registers the corresponding private ID (i.e., after a successful completion of HLR MSC approval step 103 above). After the HLR registers the public ID, it sends an approval message to the CS, at a cellular HLR CS approval step 105. Additionally or alternatively, before carrying out step 104, CS 72 may first check whether the public ID is already registered in the HLR (for example because another terminal 22 associated with this public ID is already registered). If the public ID is already registered, steps 104 and 105 are omitted.

In some embodiments, public IDs are also registered in SIP application servers 60 in parallel to the registration in the HLR. In these embodiments, CS 72 sends a SIP registration message to SIP AS 60, at a cellular SIP registration step 106. The SIP application servers register the public ID and approve the SIP registration message, at a cellular SIP approval step 107.

After the registration method described above is completed, two records are added to the HLR: (1) the cellular phone's private ID is registered with a record pointing to the serving MSC and (2) the corresponding public ID is registered with a record pointing to the CS.

Figure 6:
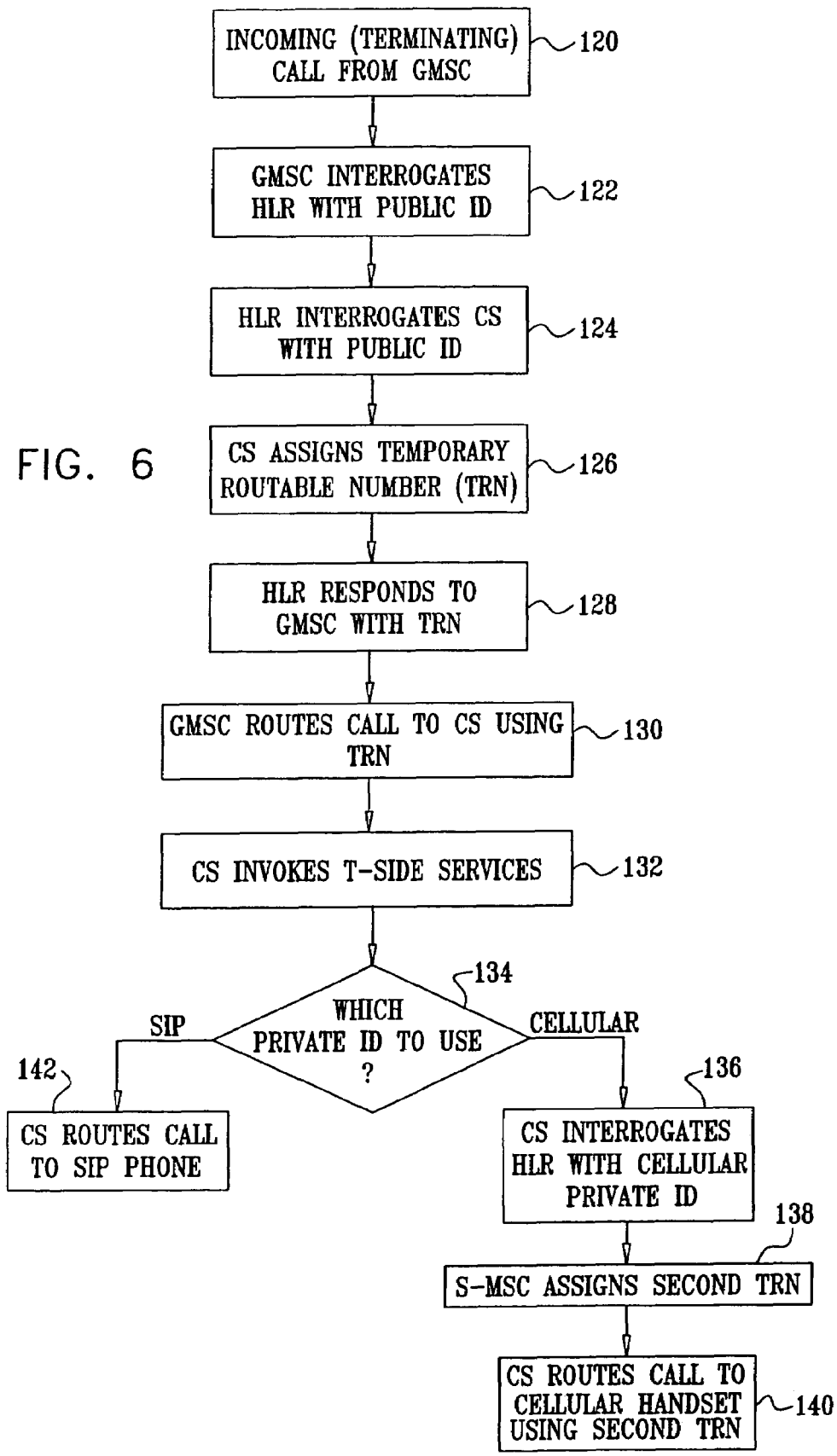
FIG. 6 is a flow chart that schematically illustrates a method for processing incoming calls, in accordance with an embodiment of the present invention.
Figure 7:
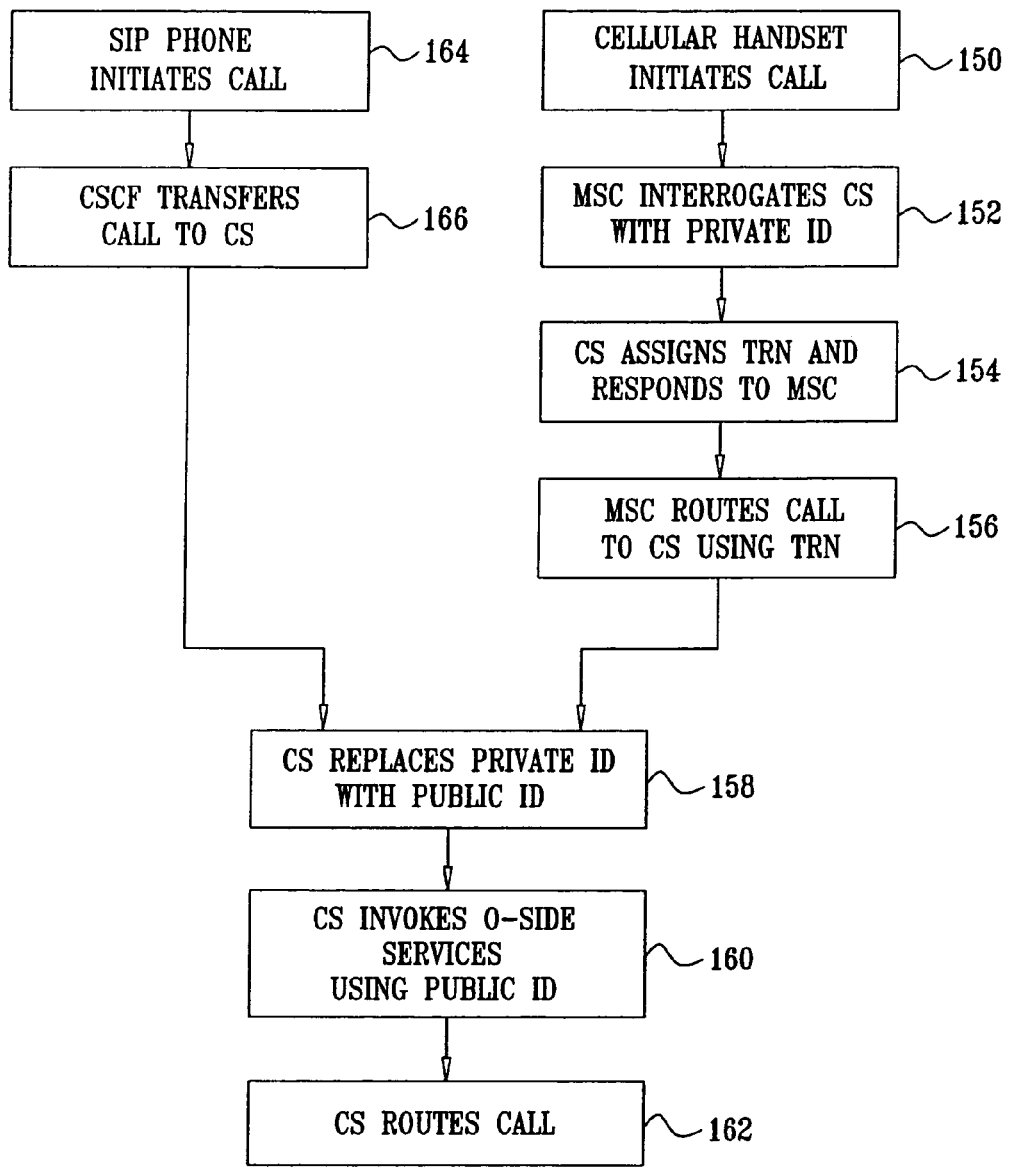
FIG. 7 is a flow chart that schematically illustrates a method for processing outgoing calls, in accordance with an embodiment of the present invention.

If additional terminals 32 (and optionally other terminals 52) associated with this public ID are also active, the private IDs of these terminals will also be registered in the HLR using additional, mutually-independent records. The use of these records in the processing and routing of incoming and outgoing calls is shown in FIGS. 6 and 7 below.

Figure 5:
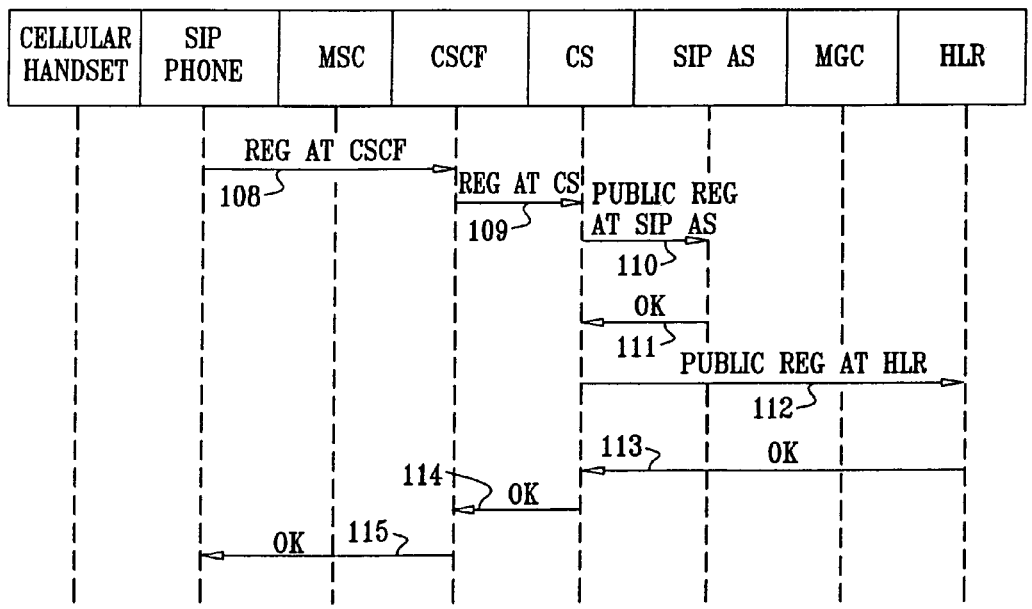
FIG. 5 is a call-flow diagram that schematically illustrates a method for registration with a packet network, in accordance with an embodiment of the present invention.

FIG. 5 is a call-flow diagram that schematically illustrates a method for registering a SIP terminal with packet network 28, in accordance with an embodiment of the present invention. The method begins with a SIP terminal, for example a SIP phone, attempting to join network 28. The SIP terminal sends a registration message to CSCF 56 using its private ID, at a terminal CSCF registration step 108. The CSCF registers the SIP terminal's current IP address.

CSCF 56 now sends a registration message to CS 72, at a CSCF CS registration step 109. The CS accepts the message carrying the private ID and retrieves the corresponding public ID from registry 92. The CS then registers the public ID at SIP application servers 60 and at HLR 40. In some embodiments, the CS accepts from CSCF 56 a routable address of the SIP terminal, such as an IP address or a SIP Uniform Resource Identifier (URI) of the terminal. The CS stores the routable address of the SIP terminal and uses it to route subsequent incoming calls destined to the terminal.

Optionally, CS 72 also sends a registration message to AS 60, at a terminal AS registration step 110. The SIP application servers register the public ID with a record pointing to the CS, and approve the registration message, at an AS CS approval step 111.

CS 72 sends a registration message to HLR 40, at a SIP CS HLR registration step 112. The message requests the HLR to register the public ID with a record pointing to the CS (i.e., requesting to define the CS as the VLR of the public ID). After the HLR registers the public ID, it sends an approval message to the CS, at a SIP HLR CS approval step 113. Having completed the registration process, CS 72 approves the registration to CSCF 56, at a CS CSCF approval step 114. CSCF 56 in turn approves the registration to the SIP phone, at a CSCF terminal approval step 115.

When the process described above is completed, the HLR comprises an additional record registering the public ID and pointing to the CS. The SIP application servers also comprise a similar record. The CSCF comprises a record registering the private ID of the SIP terminal, as well as a routable address of the SIP terminal. In some embodiments, the routable address is also stored in the CS. The use of these records in the processing and routing of incoming and outgoing calls is shown in FIGS. 6 and 7 below.

Processing of Incoming and Outgoing Calls

FIG. 6 is a flow chart that schematically illustrates a method for processing incoming calls arriving into system 20, in accordance with an embodiment of the present invention. Generally, the method describes the following sequence of actions, performed in system 20 in response to an incoming call: (1) determine the terminals (private IDs) that correspond to the public ID provided in the call, (2) determine to which of the private IDs the call is to be routed and (3) route the call to its appropriate destination.

The exemplary method of FIG. 6 refers to an incoming call carrying a public ID that corresponds to two terminals 22, namely a cellular phone 32 and a SIP phone 52. The method can be adapted in a straightforward manner to process incoming calls for different types of communication domains and terminals, and for any number of domains and terminals. Exemplary call flows showing the routing of incoming calls are described in FIGS. 10 and 11 below.

The method begins when an incoming call (also referred to as a terminating call) is accepted at system 20, at a call acceptance step 120. The call is destined to a particular subscriber of system 20, and thus carries the public ID (e.g., telephone number) of the subscriber.

The call may originate from any communication terminal, either from within system 20 or from an external network, such as PSTN 78. In the present example, the call is assumed to enter network 20 via one of MSCs 36, serving as a gateway MSC (GMSC). A similar sequence of steps can be used to process an incoming call that originated by another terminal 22 within network 20.

The GMSC interrogates HLR 40 using the public ID, at an HLR interrogation step 122. By interrogating the HLR, the GMSC requests the HLR to provide a routable number or network address, to which the incoming call should be routed. As explained above, CS 72 is already defined in the HLR as the VLR that serves the public ID. Thus, after being interrogated by the GMSC, the HLR interrogates the CS (i.e., requests the CS to provide a routable number or address for routing the call) using the public ID, at a CS interrogation step 124.

Redirection proxy 96 of CS 72 assigns a first temporary routable number (TRN) to the incoming call, at a first TRN allocation step 126. The assigned TRN is associated with the CS, so that routing the call to the first TRN causes the call to be routed to the CS. Typically, the redirection proxy selects the first TRN out of a predetermined pool of temporary routable numbers associated with the CS. The CS sends the first TRN to the HLR. Additionally, the redirection proxy associates the first TRN with the public ID, and caches the TRN and public ID along with the context of the incoming call.

HLR 40 responds to the GMSC interrogation of step 122 above, at an HLR response step 128. The HLR sends the first TRN assigned by redirection proxy 96 to the GMSC. The GMSC routes the incoming call to the TRN provided by the HLR, at a GMSC routing step 130. Since the first TRN is associated with CS 72, the call is routed to the CS.

In some embodiments, an incoming call invokes one or more incoming call services (T-side services). For example, if the public ID of the incoming call is a toll-free telephone number, the call causes an invocation of a toll-free service that redirects the call to the actual phone number of the subscriber, and charges the call to the subscriber's bill. Such service may be carried out by an SCP 44 in network 24, by a SIP AS 60 in network 28, or both. (SCPs 44 and SIP AS 60 are collectively referred to herein as service platforms.) Another example of a T-side service is an interactive voice response (IVR) service, in which the caller interacts with predetermined voice menus carried out by a SCP 44 or AS 60.

In these embodiments, when the CS receives the incoming call routed to it by the GMSC, the CS invokes the appropriate T-side services for this call, at a T-side invocation step 132. Since the T-side services are invoked responsively to the public ID carried by the incoming call, these services are invoked regardless of the terminal (private ID) to which the call is about to be routed. T-side services are sometimes invoked and carried out responsively to service parameters stored in the HLR.

CS 72 now determines to which of the private IDs associated with the public ID the incoming call is to be routed, at a terminal selection step 134. (In some cases, the incoming call arriving from the GMSC does not carry the public ID but only the TRN. However, since the association between the public ID and the TRN is already cached in redirection proxy 96, the proxy is able to determine the public ID and the associated private IDs.)

Typically, control module 80 of CS 72 queries registry 92 in order to determine which private ID (or IDs) is currently registered. If only one private ID (terminal) is currently registered in the HLR or in registry 92, the CS determines that the call should be routed to this private ID. If more than one private ID associated with the public ID is registered (i.e., more than one terminal operated by the subscriber is currently available for accepting the call), module 80 may apply any suitable business logic to select to which of these private IDs to route the call.

For example, one of the terminals may be predefined as having a higher priority. The selected terminal may also depend on the type of the call (e.g., send SMS messages to the SIP phone and voice calls to the cellular phone). Additionally or alternatively, the selection may be based on any suitable criteria such as time of day, user preferences, cost of calls in each of the networks, and the current load, capacity and quality of service (QoS) of each network.

In some embodiments, the decision can be made using external application logic. For example, a service platform such as an application server 60 may be used to determine where to route the call.

If the CS determines that the call should be routed to the cellular phone private ID, the CS interrogates the HLR using the cellular private ID, at a cellular HLR interrogation step 136. The HLR queries the S-MSC serving the Mobile terminal 32, which in turn assigns a second TRN (not to be confused with the first TRN assigned at step 126 above), at a second TRN assignment step 138. The second TRN is associated with the private ID of the cellular phone. The CS routes the incoming call to the second TRN, thus routing the call to the cellular phone, at a cellular routing step 140.

After completing step 140 above, the incoming call has been routed from the GMSC, via the CS, to the subscriber's cellular phone. It is important to note that the CS, by using the first TRN, remains part of the signaling path of the incoming call. By remaining part of the signaling path, the CS is able to monitor the progress of the incoming call, invoke additional services, perform hand-off, or otherwise affect the call as needed.

If, on the other hand, the CS determines at step 134 above that the call should be routed to the subscriber's SIP phone private ID, the CS routes the call to the SIP phone, at a SIP phone routing step 142. In some embodiments, a routable address (such as a SIP URI) of the SIP phone has already been stored in registry 92 of the CS during registration of the SIP phone. (See, for example, the registration process of FIG. 5 above.) In these embodiments, the CS routes the call directly to the SIP phone using the routable address. In alternative embodiments, the CS routes the call via the CSCF, which stores the routable address of the SIP phone.

Thus, the incoming call is routed from the GMSC, via the CS, to the SIP terminal. In this case too, the CS remains part of the signaling path and is able to invoke T-side services, perform hand-offs and otherwise affect the progress of the call.

FIG. 7 is a flow chart that schematically illustrates a method for processing outgoing calls originating in system 20, in accordance with an embodiment of the present invention. The exemplary method of FIG. 7 refers to outgoing calls originating from either a cellular phone 32 in network 24 or a SIP phone 52 in network 28. The method can be similarly used to process outgoing calls in different types of communication domains and terminals, and for any number of domains and terminals. The destinations of outgoing calls may comprise other terminals 22 in system 20 or external communication terminals, such as terminals reached over PSTN 78. Exemplary call flows showing the routing of outgoing calls are described in FIGS. 12 and 13 below.

We shall first describe the processing of an outgoing call originating from a cellular phone 32. The processing of a call originating from a SIP phone 52 is described further below. A cellular phone 32 initiates an outgoing call (also referred to as an originating call) using its private ID, at a cellular initiation step 150. The cellular phone is assumed to be registered in one of MSCs 36, referred to as the serving MSC (S-MSC) of this phone.

The S-MSC sends a message to the CS using the phone's private ID, at an outgoing CS interrogation step 152. In some embodiments, the S-MSC views the CS as an SCP, in accordance with the IN protocols. In these embodiments, the message sent from the S-MSC to the CS comprises an IN trigger similar to a service invocation.

CS 72 causes the call to be routed through the CS, thus assuming control over the call, at a CS response step 154. The redirection proxy in the CS assigns a TRN to the outgoing call and caches the association between the TRN and the private ID. The CS responds to the S-MSC with a message comprising the TRN. The S-MSC routes the outgoing call to the CS using the TRN, at a MSC routing step 156.

Since the cellular phone (as well as the SIP terminal) is known to other subscribers by its public ID, the outgoing call should carry the public ID and not the private ID. Therefore, when the CS accepts the routed outgoing call, control module 80 replaces the private ID in the call with the public ID, at an ID replacement step 158. The replacement effectively hides the private ID from other subscribers and network elements.

In some embodiments, the outgoing call carries the TRN assigned at step 154 above and not the private ID itself. In these embodiments, the redirection proxy is able to determine the desired private ID using the previously-cached association between the TRN and the private ID.

The CS now invokes any O-side services that may be defined for the outgoing call, at an O-side invocation step 160. Like T-side services, an O-side service may be carried out by SCPs 44 in network 24, by SIP application servers 60 in network 28, or both. Since the O-side services are invoked responsively to the newly-replaced public ID, these services are invoked regardless of the terminal (private ID) that originated the outgoing call.

Normally, O-side services are invoked in accordance with a predetermined subscriber profile associated with the public ID. However, in some embodiments, CS 72 can notify the application servers and/or SCPs of the private ID being used, in order to allow for terminal capability aware services. Notification to SCPs can be performed, for example, using digit processing. Notification to application servers can be performed, for example, using SIP extensions. The subscriber profile, as well as other service parameters affecting service invocation, is typically stored in the HLR (or in another database, such as an HSS). After invoking the O-side services applicable to the outgoing call, CS 72 routes the call to its destination.

In an alternative embodiment to using the first TRN, terminal 32 may initiate a preliminary interaction with the CS, before carrying out step 150 above, for example using an SMS message. Then, the terminal initiates a call to a distinguished name (DN) associated with to the CS, thus ensuring that the call is routed through the CS and that the CS remains on the signaling path of the call.

We shall now describe the process of processing an outgoing call originating from a SIP phone. The method begins when a SIP phone 52 initiates an outgoing call, at a SIP initiation step 164. The SIP phone communicates with CSCF 56. The CSCF transfers the outgoing call to the CS, at a CSCF CS transfer step 166. Typically, the CSCF views the CS as a SIP application server. In such a case, the transferring of the call is performed similarly to a service invocation. Once the outgoing call has been transferred to the CS, the process follows steps 158-162 above in a similar manner to the processing of calls initiated by cellular phones. The CS replaces the private ID with the public ID, invokes any appropriate O-side services and routes the call to its destination.

Providing Unified Services

The methods and systems described herein enable a service provider to unify the services provided to subscribers of all communication domains of system 20. Some of these subscribers may own multiple terminals in different communication domains, as described above. Other subscribers may use only a single terminal in a single domain. Some aspects of service unification are described in PCT Patent Application Publication WO 02/12976 A2, which is incorporated herein by reference.

In the exemplary embodiments described in FIGS. 6 and 7 above, O-side and T-side services are invoked by CS 72, regardless of whether they are carried out by a SCP 44 in network 24 or by a SIP application server in network 28. Thus, for example, a subscriber using a cellular phone in network 24 may be offered a service that is implemented in a SIP application server in network 28, and vice versa.

Furthermore, in some embodiments, services carried out by service platforms in different communication domains can be invoked during a single call. For example, an incoming call may invoke a call screening service running on a SIP AS in network 28, and an abbreviated dialing service running on a SCP in network 24.

The ability to unify services across the different domains of system 20 enables the service provider to avoid duplication of service platforms. When using previously-known network solutions, a service provider wishing to offer a particular service over a mobile network and a packet network has to deploy separate SIP AS and SCP platforms, both running the same service. By contrast, the methods and systems described herein enable the provider to deploy only a single unified service platform, either a SCP or a SIP AS, and use this platform to offer the service to subscribers of all communication domains.

In some cases, a service provider is in the process of migrating from a legacy network to a new generation network. By unifying the services across the legacy and new generation networks, the service provider is able to invest in adding services and service platforms only in the new generation network. The provider can minimize further investments in the legacy network, while still offering every service of the new generation network to legacy network subscribers.

Distributed GMSC Configurations

In many practical situations, a service provider operates a circuit-switched network and a packet-switched network simultaneously, often over the same geographical area. Such a situation is encountered, for example, when a service provider is in the process of migrating from a legacy circuit-switched network to a new generation network having a packet-switched backbone.

Another example of such a situation is a virtual mobile network operator (MVNO), which owns a packet-switched network and uses it to access a mobile service of another operator in order to provide wireless services without actually owning a mobile radio network.

In such situations it is often desirable to off-load signaling traffic, media traffic and processing tasks from the circuit-switched network and transfer this load to the packet-switched network, as well as to simplify the routing of calls. In the description that follows we shall refer to networks 24 and 28 of FIG. 1 above as examples of circuit-switched and packet-switched networks, respectively. As will be shown below, deploying convergence server 72 between the two networks enables off-loading the circuit-switched network by distributing the functionality of the gateway MSCs (GMSCs) of the circuit-switched network to other network elements. This architecture also simplifies the signaling and call handling performed for calls destined to terminals in the circuit-switched network.

In some known configurations that combine a circuit-switched network and a packet-switched network, an incoming call destined to a terminal in the circuit-switched network arrives at one of media gateways (MGW) 64, often a MGW adjacent to the origin of the incoming call. In these configurations, the MGW and the MGC controlling it are not aware of the destination MSC (S-MSC) to which the incoming call should be routed, since this information is stored in the HLR. Therefore, the MGC has to forward the call to a designated gateway MSC (GMSC), which interrogates the HLR and determines the identity of the appropriate S-MSC. Only then the call can be routed to the S-MSC and to its final destination.

It can be appreciated that the resulting routing path and the sequence of actions associated with it are often long and complicated.

Embodiments of the present invention provide improved methods and system configurations for handling incoming calls destined to the circuit-switched network that arrive at the packet-switched network. In principle, in the methods described below, convergence server 72 is deployed in conjunction with MGC 68. Since, as described above, CS 72 comprises the functionality of interrogating HLR 40, the CS can interrogate the HLR on behalf of MGC 68. CS 72 thus enables the call to be processed without having to route the call to, or otherwise use, any gateway switching element of the circuit-switched network, such as a GMSC.

Figure 8A:
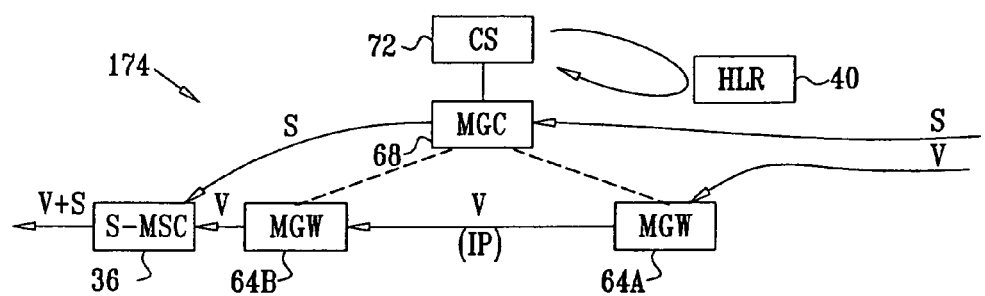
FIGS. 8A and 8B are block diagrams that schematically illustrate distributed gateway mobile switching center (GMSC) configurations, in accordance with embodiments of the present invention.
Figure 8B:
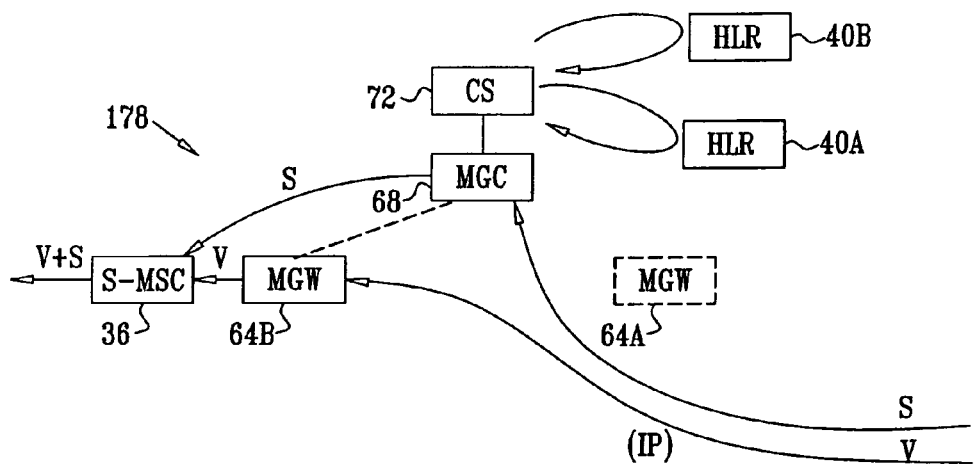

FIGS. 8A and 8B are block diagrams that schematically illustrate distributed GMSC configurations, in accordance with embodiments of the present invention.

FIG. 8A shows a distributed system configuration 174, in accordance with an embodiment of the present invention. In this configuration, convergence server 72 is deployed in conjunction with MGC 68. The functionality of CS 72 in interrogating HLR 40 and routing incoming calls is similar to the functionality described in FIG. 6 above. Note, however, that the use of public and private IDs is not mandatory in the present context.

When an incoming call destined to a destination terminal of the circuit-switched network arrives, the signaling information (denoted S in the figures) of the incoming call is provided directly to MGC 68. The voice content of the call, denoted V, or other media content, is provided directly to MGW 64A, typically in the vicinity of the point in which the call enters system 174. Note that although the incoming call arrives into the packet-switched network, the call itself is not necessarily a packet-switched call. For example, the signaling of the incoming call may comprise SS7 signaling.

The MGC views CS 72 as a standard application server, and sends the signaling of the incoming call to the CS (e.g., via SIP signaling). CS 72 interrogates HLR 40 and obtains from the HLR the necessary routing information for routing the call in the circuit-switched network. As described in FIG. 6 above, the CS receives a TRN from the HLR and sends the TRN to the MGC via signaling. This message appears to the MGC as if an application server has changed the destination of the call. The signaling is then routed to S-MSC 36, as instructed by the HLR. MGC 68 instructs MGW 64A to route the voice content over the IP backbone of the packet-switched network to MGW 64B, from which it is routed to S-MSC 36 and to the destination terminal.

It can be seen that no GMSC participates in the process. In effect, the functionality of the gateway MSC has been distributed between MGC 68 and CS 72. As a result, the processing and communication handling required from the GMSCs in the network is significantly reduced. Thus, GMSC resources are freed and can be used for other functions, such as for serving as S-MSC for other calls. The method further simplifies the routing paths used for routing incoming calls.

In some embodiments, CS 72 may receive from the HLR an indication regarding call services that should be provided to the incoming call. In these embodiments, CS 72 invokes the appropriate service platform, which may comprise a SCP 44, an AS 60 or both, to provide the call services to the call. Additionally or alternatively, some call services (e.g., a call forwarding service) may relate to the routing of the call. For such services, CS 72 may perform the appropriate routing internally without invoking an external service platform.

FIG. 8B shows a network configuration 178, in accordance with an alternative embodiment of the present invention. In this configuration, the incoming call comprises a packet-switched call, such as a call arriving from an external SIP terminal or SIP trunk. Such a scenario is encountered, for example, when networks 24 and 28 are interconnected with an external packet-switched network.

The signaling information of the incoming call is routed directly to MGC 68. CS 72 interrogates the HLR and provides the appropriate routing information to MGC 68. The MGC routes the signaling information to S-MSC 36 and on to the destination terminal. The voice content of the incoming call is routed, as instructed by MGC 68, to MGW 64B and from there to S-MSC 36 and to the destination terminal. In the exemplary configuration of network 178, the call arrives directly to MGW 64B, thus MGW 64A does not participate in the call handling process.

In some embodiments, the circuit-switched network comprises multiple communication domains conforming to different protocols, each comprising a separate HLR and one or more GMSCs. In these embodiments, CS 72 can interrogate the appropriate HLR out of the multiple HLRs, thus avoiding the call from being routed to the multiple GMSCs. For example, the circuit-switched network may comprise a cellular network comprising a CDMA segment and a GSM segment. FIG. 8B shows two HLRs denoted 40A and 40B, both interrogated by CS 72.

The exemplary configurations shown in FIGS. 8A and 8B refer to a single incoming voice call handled by a small number of MSCs and media gateways. These configurations were chosen purely for the sake of conceptual clarity. The methods and systems described herein can be similarly used to handle other types of calls comprising signaling and media content, such as multimedia sessions. These methods and systems can be used in networks having a higher number of MSCs and/or MGWs. Typically, the benefit of distributing the functionality of gateway MSCs increases with growing network complexity.

An exemplary application of configurations 174 and 178 is enabling a mobile virtual network operator (MVNO) to use a wireless network of another service provider. Assume that the systems shown in FIGS. 8A-8C comprise wireless networks. The incoming calls comprise calls originating from a MVNO that provides connectivity and services to subscribers without actually owning a wireless network. Thus, MGC 68 and CS 72 jointly function similarly to a GMSC that allows calls originating from the MVNO to be processed by the wireless network.

Figure 9:
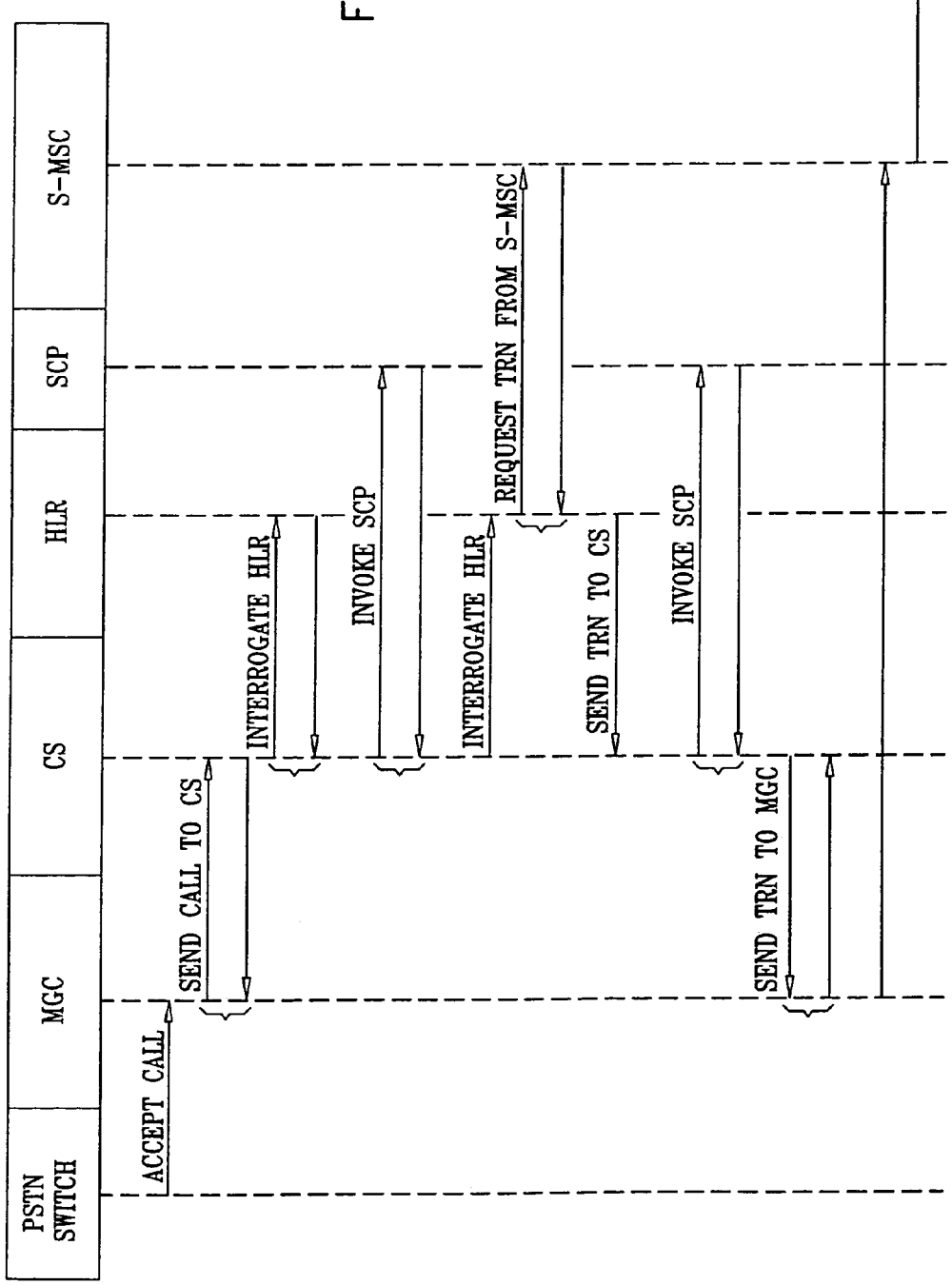
FIG. 9 is a call-flow diagram that schematically illustrates a method for processing an incoming call using a distributed GMSC configuration, in accordance with an embodiment of the present invention.

FIG. 9 is a call-flow diagram that schematically illustrates a method for processing an incoming call using a distributed GMSC configuration, such as the configurations of FIGS. 8A and 8B above, in accordance with an embodiment of the present invention. The call flow begins with the signaling of an incoming call arriving at MGC 68. (The figure refers to the signaling of the call. As explained above, the voice content of the call arrives at one of MGW 64.)

MGC 68 sends the call to CS 72, which typically acknowledges the acceptance of the call. CS 72 interrogates HLR 40 in order to determine which call services should be provided to the incoming call. The HLR returns a list of services and parameters, such as an IN trigger list. The CS invokes the requested services by invoking the appropriate SCP 44. Using this technique, the T-side services previously provided by the gateway MSC can now be provided by the CS.

CS 72 now interrogates HLR 44 again, this time in order to request a TRN to which to route the incoming call. The HLR in turn interrogates the S-MSC and sends the TRN sent by the S-MSC to the CS. The CS may optionally invoke SCP 44 again. The CS sends the TRN to the MGC, which typically acknowledges. The MGC then uses the TRN to route the incoming call to the destination terminal via the S-MSC. In this exemplary call flow, the CS remains part of the signaling path of the call, so that it may continue to provide call services during the call.

Call Flow Examples

The following section provides additional exemplary call flows, in order to demonstrate several aspects of the methods and systems described above.

Figure 10:
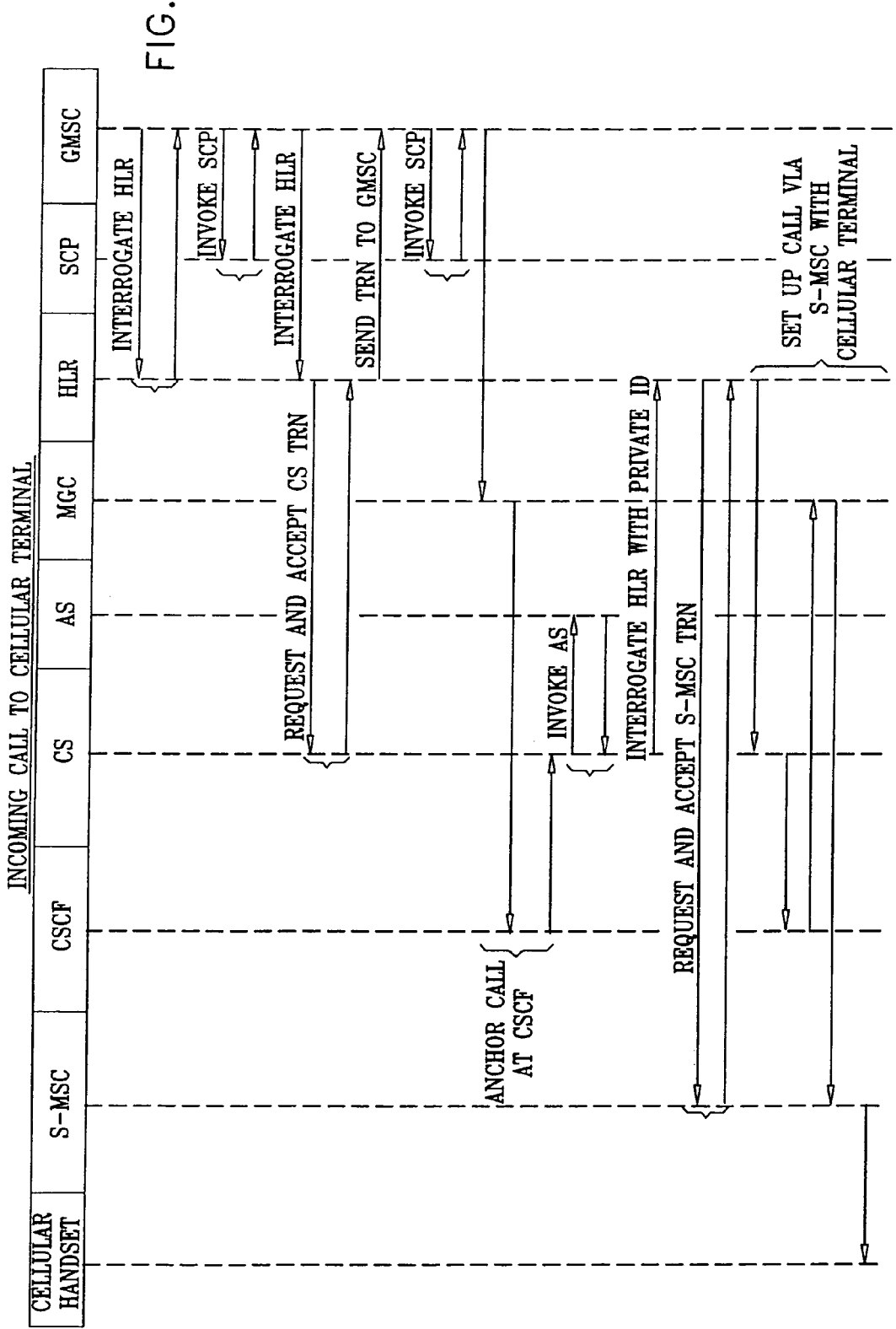
FIGS. 10-14 are call-flow diagrams that schematically illustrate methods for processing incoming and outgoing calls, in accordance with embodiments of the present invention.

FIG. 10 is a call-flow diagram that schematically illustrates a method for processing incoming calls destined to a cellular phone 32 in circuit-switched mobile network 24, in accordance with an embodiment of the present invention. The call flow follows the principles described in FIG. 6 above. The method begins with an incoming call arriving via a gateway MSC of network 24. The GMSC interrogates HLR 40, in order to determine which call services should be provided to the incoming call. The HLR responds with a list of services and service parameters, such as using an IN trigger list.

Using the list, The GMSC invokes the appropriate SCP 44 to provide the desired call services. The GMSC interrogates the HLR again, this time in order to determine the routing of the incoming call. The HLR interrogates the CS, and the CS sends the HLR a TRN (denoted CS TRN), causing the call to be forwarded to the CS. The HLR provides the CS TRN to the GMSC.

Optionally, the GMSC may choose to invoke SCP 44 again. Then, the GMSC begins a process of routing the call to the CS. In some embodiments, for example in order to simplify future hand-off processes, the routing of the call also passes through the CSCF. This process is referred to as anchoring the call at the CSCF. The CS may optionally choose to invoke additional services carried out by SIP AS 60 in network 28.

Until now, the messages exchanged in the network and the invoked services carried the public ID. At this stage, it is assumed that the CS determines that the private ID selected for routing the call is the cellular private ID. (A flow call that describes routing of an incoming call to a SIP terminal is shown in FIG. 11 below.)

The CS interrogates the HLR with the cellular private ID. The HLR communicates with the S-MSC of the destination cellular phone and requests a TRN in order to route the call to the S-MSC. The S-MSC responds with a TRN (denoted S-MSC TRN). The HLR sends the S-MSC TRN to the CS, which in turn routes the call via the MGC, CSCF and S-MSC to the destination cellular phone.

Figure 11:
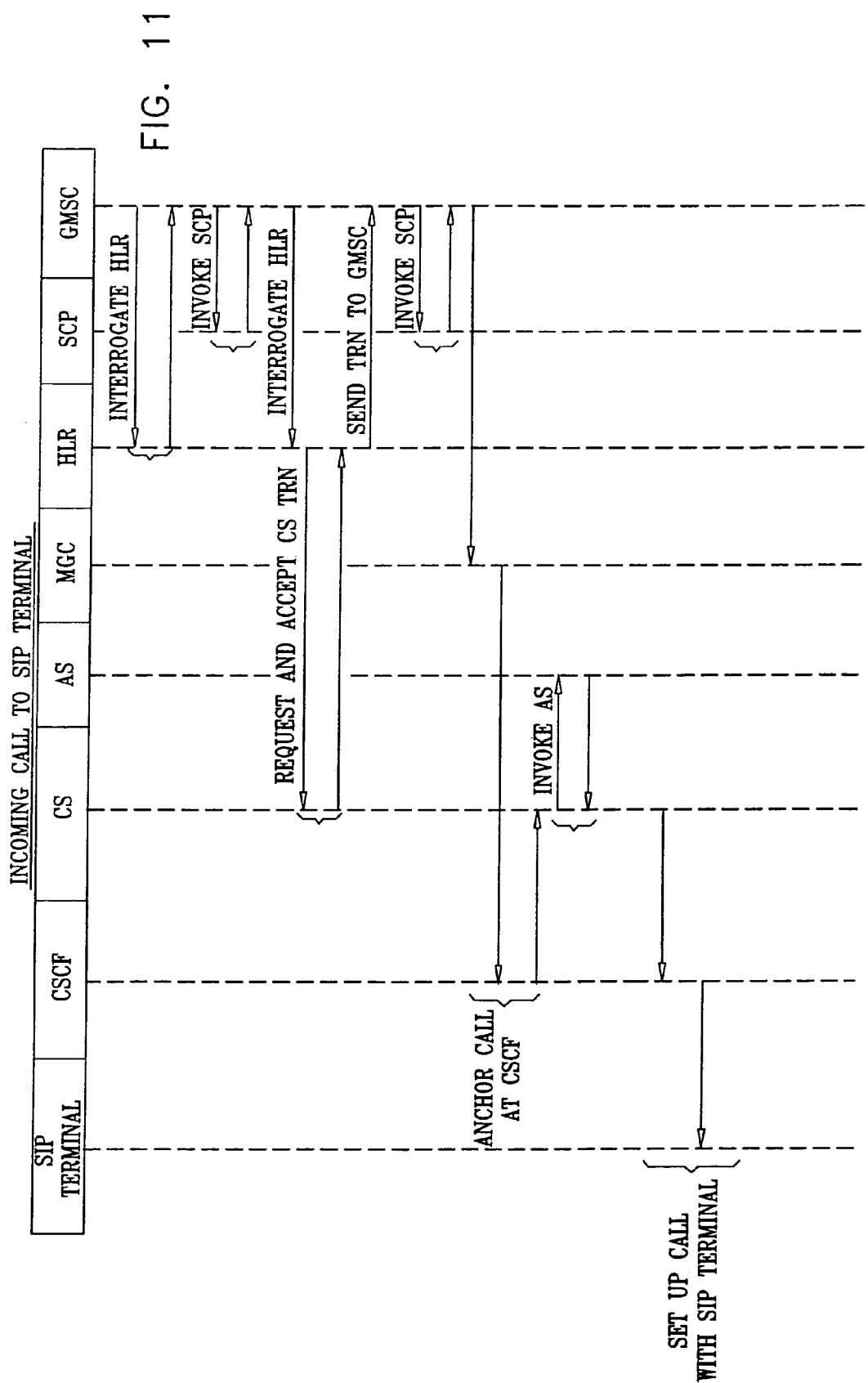

FIG. 11 is a call-flow diagram that schematically illustrates a method for processing incoming calls destined to a SIP terminal 52 in packet-switched network 28, in accordance with an embodiment of the present invention. The call flow follows the principles described in FIG. 6 above. The method begins with an incoming call arriving via a GMSC. The initial stags of the call flow are similar to the flow of FIG. 10 above. In the present example, however, after anchoring the call at the CSCF and optionally invoking SIP AS 60, it is assumed that the CS determines that the private ID selected for routing the call is the SIP private ID. Therefore, the CS routes the call via the CSCF to the destination SIP terminal.

Figure 12:
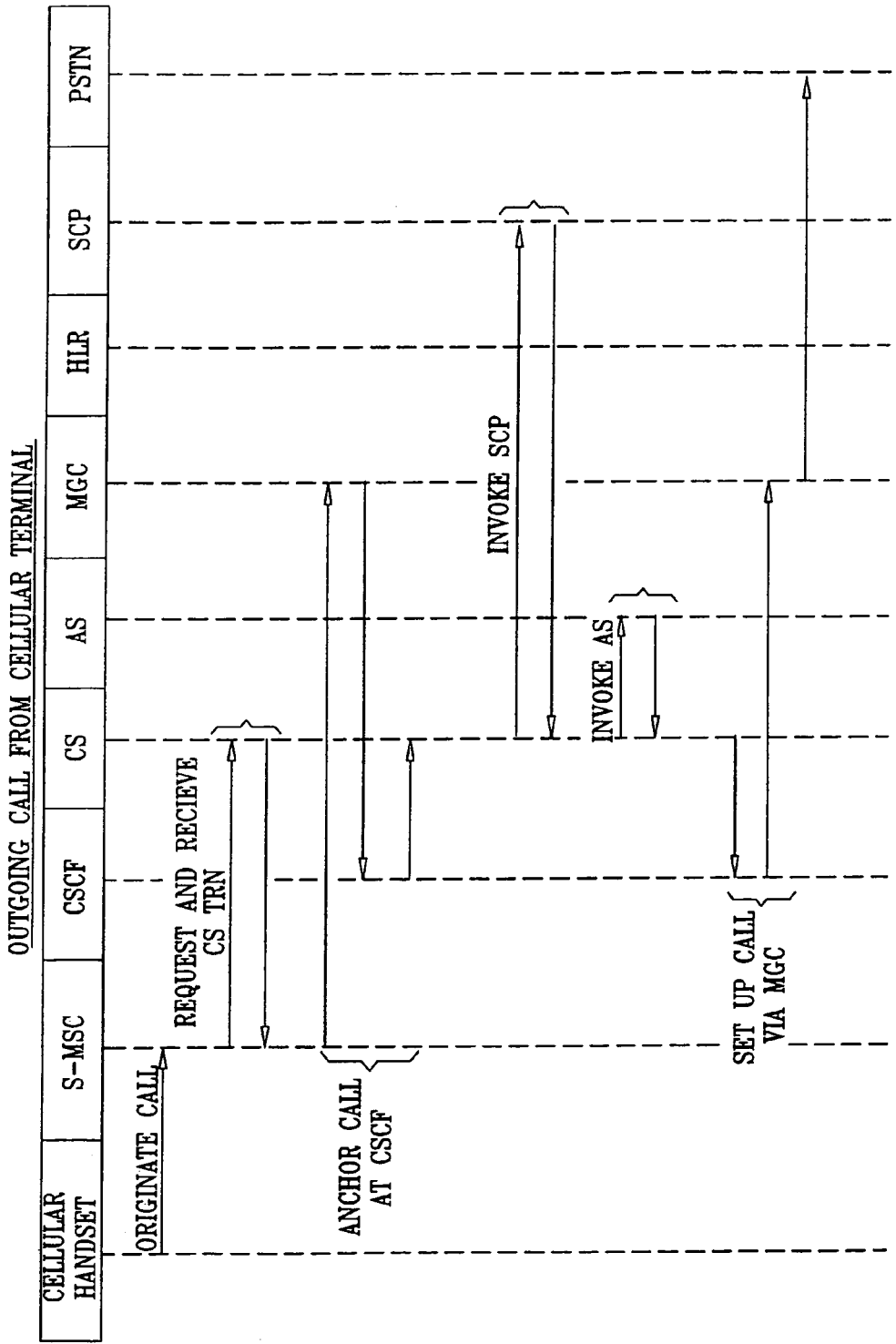

FIG. 12 is a call-flow diagram that schematically illustrates a method for processing outgoing calls initiated by a cellular phone 32 in mobile network 24, in accordance with an embodiment of the present invention. The call flow follows the principles described in FIG. 7 above. The method begins with phone 32 initiating an outgoing call. The call, carrying the phone's private ID, is sent to the S-MSC serving phone 32.

The S-MSC requests and receives a CS TRN from CS 72. The S-MSC routes the call to the CS using the CS TRN. As explained above, the call is routed ("anchored") via the CSCF and MGC.

All the above messages carry the cellular private ID. At this stage, the CS replaces the private ID with the public ID in the outgoing call. The CS may invoke SCP 44 and/or SIP AS 60 to provide O-side services to the outgoing call, based on the public ID. The CS routes the call via the CSCF and MGC to its destination, in this example over PSTN 78.

Figure 13:
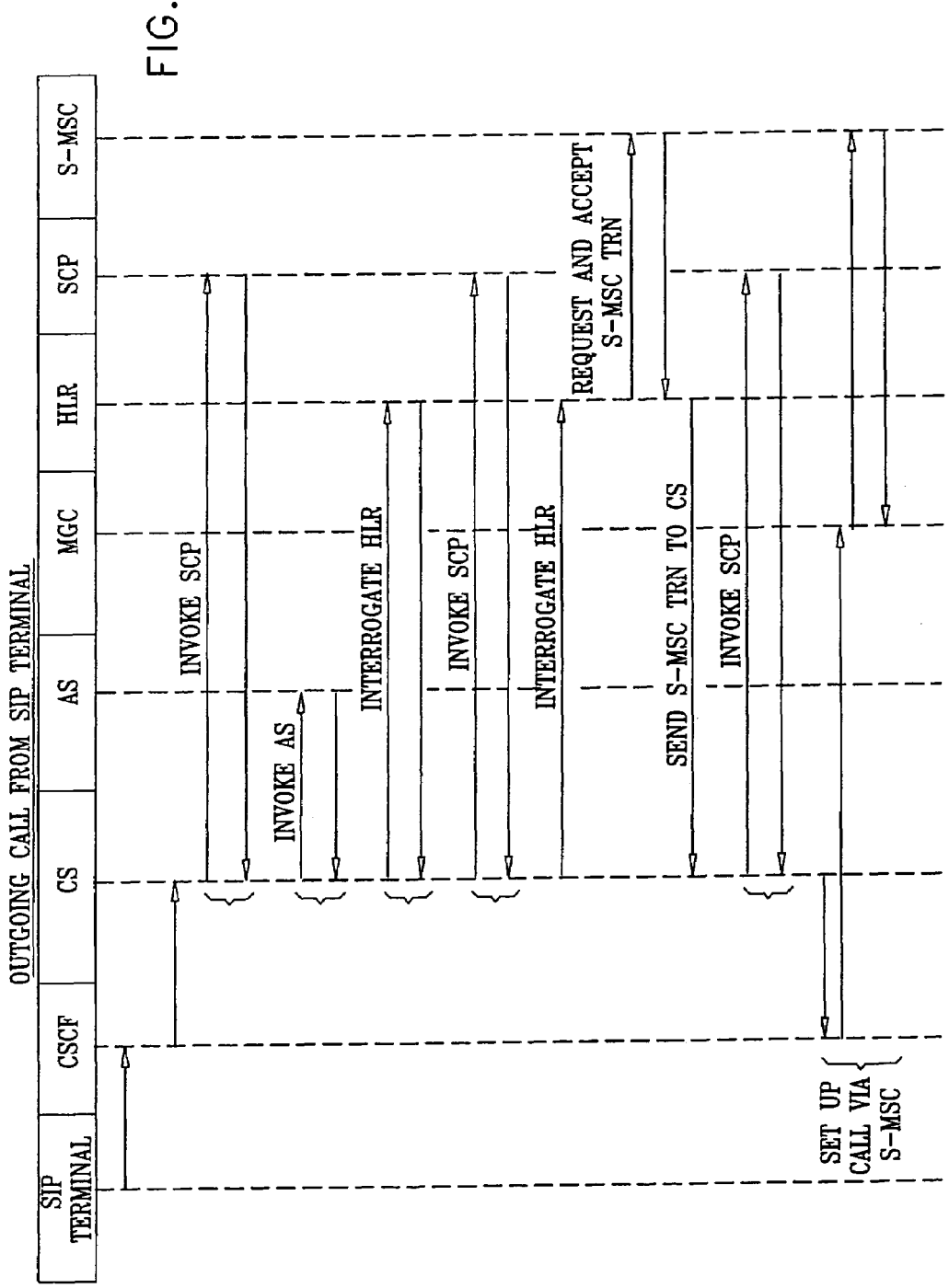

FIG. 13 is a call-flow diagram that schematically illustrates a method for processing outgoing calls initiated by a SIP terminal 52 in packet-switched network 28, in accordance with an embodiment of the present invention. The call flow follows the principles described in FIG. 7 above. In the present example, the call is destined to a cellular phone 32 in network 24. The method begins with SIP terminal 52 initiating a call carrying the SIP private ID to CSCF 56. The CSCF routes the call to CS 72, which replaces the originating SIP private ID with the corresponding public ID. Optionally, CS 72 activates O-side services by invoking SCP 44 and/or SIP AS 60.

The CS interrogates the HLR, in order to check which services should be provided to the termination side of the call (which in this example comprises a cellular phone 24). As a result of this interrogation, CS 72 may invoke SCP 44 to provide the appropriate T-side services.

The CS now interrogates the HLR in order to determine the routing of the outgoing call. The HLR requests and accepts a S-MSC TRN from the S-MSC serving the destination phone 24. The HLR sends the S-MSC TRN to CS 72. CS 72 may optionally choose to activate SCP 44 again. The CS then routes the call to the S-MSC using the S-MSC TRN.

Figure 14:
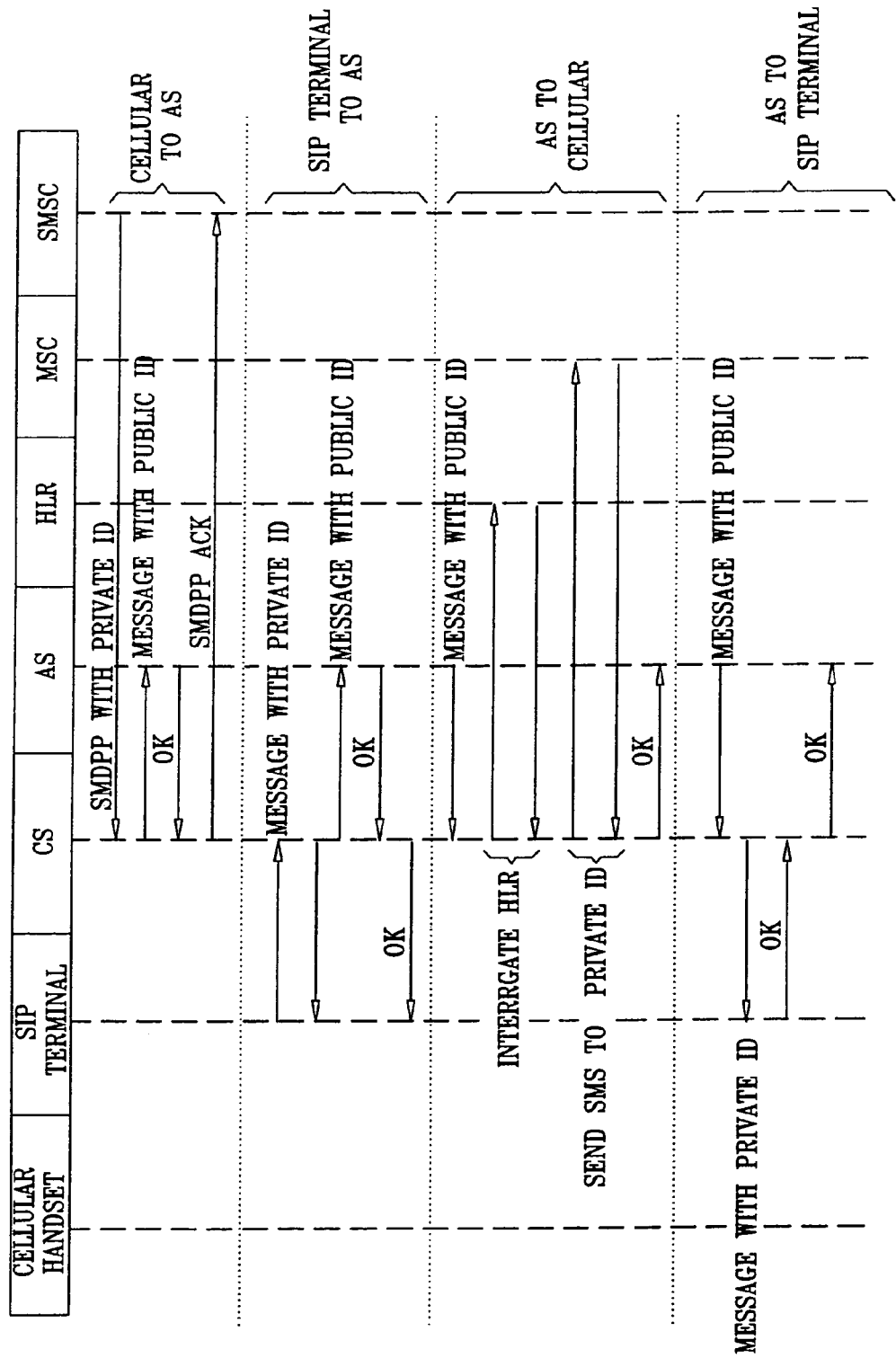

FIG. 14 is a call-flow diagram that schematically illustrates the processing of SMS messages, in accordance with an embodiment of the present invention. The figure is divided into the following four sub-processes:

Processing of an SMS message sent from network 24 to an application server (AS) that handles SMS in network 28.
Processing of an SMS message sent from a SIP terminal in network 28 to the application server.
Processing of an SMS message sent from the application server to a cellular phone 32 in network 24.
Processing of an SMS message sent from the application server to a SIP terminal in network 28.

The four sub-processes can be combined in any suitable order. For example, the second sub-process followed by the third sub-process describe the processing of an SMS message sent from a SIP terminal to a cellular phone.

Sending an SMS message from network 24 to AS 60 begins with the message being provided to SMS center (SMSC) 48. The message may originate from a cellular phone 24 or from any other suitable source, such as a web-based messaging service connected to SMSC 48, as is known in the art. SMSC 48 sends the SMS message to CS 72 using the originating private ID. The CS replaces the private ID with the public ID and forwards the message to AS 60. AS 60 sends an acknowledgement to CS 72 and CS 72 sends an acknowledgement to SMSC 48.

Sending an SMS message from SIP terminal 52 in network 28 to AS 60 begins with the SIP terminal sending the message to CS 72, which the CS acknowledges. CS 72 then replaces the private ID in the message with the public ID, and sends the message to AS 60. AS 60 sends an acknowledgement to CS 72, which in turn acknowledges to SIP terminal 52.

Sending an SMS message from AS 60 to a destination cellular phone 32 begins with AS 60 sending the message to CS 72. The message carries the terminating public ID. The CS selects the private ID to which the message is to be sent, in this example the cellular private ID. The CS interrogates HLR 40 in order to obtain the identity of the MSC serving the destination cellular phone. The HLR responds and provides the routing address of the MSC. The CS then sends the SMS message to the MSC, to be forwarded to the destination cellular phone. The procedure is completed with the MSC sending an acknowledgement to CS 72, and CS 72 sending an acknowledgement to AS 60.

Sending an SMS message from AS 60 to a destination SIP terminal 52 begins with AS 60 sending the message to CS 72. The message carries the public ID. The CS selects the private ID to which the message is to be sent, in this example the SIP private ID. The CS sends the message to the destination SIP terminal. The procedure is completed with the SIP terminal sending an acknowledgement to CS 72, and CS 72 sending an acknowledgement to AS 60.

Note that in the processing of SMS messages, unlike voice calls, the signaling and data go through the same path. Therefore, it is generally unnecessary to use the TRN mechanism when processing SMS messages. Once the SMS message is forwarded to its destination, the process is considered completed.

Hand-Off Procedures

FIGS. 15 and 16 are call-flow diagrams that schematically illustrate methods for handing-off calls, in accordance with embodiments of the present invention. In the present example, the assumption is that a particular dual-mode terminal comprises a cellular phone 32 and a Wi-Fi SIP terminal 52. FIG. 15 describes an exemplary hand-off procedure for handing off an active call from the SIP terminal to the cellular phone. A hand-off procedure from the cellular phone to the SIP phone is described in FIG. 16 further below.

The method of FIG. 15 begins in a situation in which an active call exists between the Wi-Fi SIP terminal of the dual-mode terminal and between a third terminal, in this example over PSTN 78. In principle, the hand-off process comprises three stages: (1) initiating a new call from the cellular phone of the dual-mode terminal to the CS in parallel to the existing SIP call, (2) connecting the new call to the third terminal and (3) terminating the original call with the SIP terminal.

In some embodiments, cellular phone 32 initiates the new call to a static number associated with the CS. The static number is dedicated to hand-off procedures. Therefore, whenever the CS accepts a call to this number, it concludes that the call is part of a hand-off process and treats it accordingly. The CS optionally updates SIP AS 60 regarding the hand-off process in progress.

The cellular phone of the dual-mode terminal initiates a cellular call with the third terminal via the S-MSC serving phone 32. The CS then connects the two cellular calls (the call between phone 32 and the CS and the call between the CS and the third terminal) to produce the new call between phone 32 and the third terminal. Having established the new call, the CS terminates the SIP call.

FIG. 16 describes an exemplary hand-off procedure for handing off an active call from the cellular phone to the SIP terminal. The method of FIG. 16 begins in a situation in which an active call exists between the cellular phone of the dual-mode terminal and between a third terminal, in this example over PSTN 78. In principle, the hand-off process comprises three stages: (1) initiating a new SIP call from the SIP terminal of the dual-mode terminal to the CS in parallel to the existing cellular call, (2) connecting the new SIP call to the third terminal and (3) terminating the original cellular call.

The SIP terminal of the dual-mode terminal initiates a new SIP call. Similarly to the process of FIG. 14 above, the new SIP call is destined to a static number associated with the CS, which is dedicated to hand-off processes. The CS may choose to update SIP AS 60 regarding the hand-off process. The CS connects the call to the third terminal via the CSCF and terminates the original cellular call.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for communication, comprising:
    assigning to at least first and second communication terminals of a communication system at least respective first and second private identities and a common public identity different from at least the first and second private identities;
    storing an association between the private identities and the common public identity in a Convergence Server (CS) connected to the communication system;
    maintaining at least one of first and second registration records, which respectively represent the first and second private identities, in a database of the communication system that is separate from the CS;
    simultaneously with the at least one of the first and second registration records, maintaining in the database an additional registration record, which represents the common public identity and comprises an identification of the CS as a Visitor Location Register (VLR) of the common public identity;
    receiving at the database a request to set up a call in which the public identity serves as one of a source and a destination of the call;
    based on the identification of the CS as the VLR of the common public identity by the additional registration record, querying the association stored in the CS in order to identify one or more of the private identities that is to participate in the call; and
    establishing the call between a third communication terminal and one of at least the first and second communication terminals using the registration records of the private identities identified using the queried association.

2. The method according to claim 1, wherein the first communication terminal communicates with a first network conforming to a first communication domain, and wherein the second communication terminal communicates with a second network conforming to a second communication domain different from the first communication domain.

3. The method according to claim 2, wherein establishing the call comprises invoking a first service platform in the first network to provide a first call service and invoking a second service platform in the second network to provide a second call service, the first and second call services associated with the public identity.

4. The method according to claim 1, wherein receiving the request comprises receiving an incoming call destined to a subscriber associated with the public identity, and wherein establishing the call comprises selecting a terminal from among the first and second communication terminals, and routing the incoming call to one of the first and second private identities that is assigned to the selected terminal.

5. The method according to claim 4, wherein routing the incoming call comprises routing the incoming call to the selected terminal via the CS.

6. The method according to claim 5, wherein routing the incoming call comprises assigning to the received incoming call a first temporary routable number (TRN) associated with the CS in order to cause the incoming call to be routed to the CS.

7. The method according to claim 6, wherein routing the incoming call further comprises assigning to the incoming call routed to the CS a second TRN so as to cause the incoming call to be routed from the CS to the selected terminal.

8. The method according to claim 6, wherein assigning the first TRN comprises caching at the CS a linkage between the first TRN and the public identity and, when the incoming call routed to the CS does not carry the public identity, determining the public identity responsively to the cached linkage.

9. The method according to claim 1, wherein receiving the request comprises receiving an outgoing call initiated by an initiating terminal comprising one of the first and second communication terminals, the outgoing call addressed to a destination, and wherein establishing the call comprises routing the outgoing call to the destination via the CS.

10. The method according to claim 9, wherein routing the outgoing call comprises replacing in the outgoing call a private identity of the initiating terminal with the public identity.

11. The method according to claim 9, wherein routing the outgoing call via the CS comprises assigning to the received outgoing call a temporary routable number (TRN) associated with the CS, so as to cause the outgoing call to be routed to the CS, and subsequently routing the outgoing call from the CS to the destination.

12. The method according to claim 11, wherein assigning the TRN comprises caching at the CS a linkage between the assigned TRN and one of the first and second private identities associated with the initiating terminal, and, when the outgoing call routed to the CS does not carry the private identity of the initiating terminal, determining the private identity of the initiating terminal responsively to the cached linkage.

13. The method according to claim 1, wherein establishing the call comprises invoking a call service associated with the public identity.

14. The method according to claim 1, wherein establishing the call comprises handing-off the call from the one of the first and second communication terminals to another of the first and second communication terminals.

15. The method according to claim 1, wherein the database comprises a Home Location Register (HLR).

16. A Convergence Server (CS), comprising:
    a registry, which is arranged to hold an association between at least first and second private identities of at least respective first and second communication terminals of a communication system and a common public identity different from at least the first and second private identities; and
    a processor, which is arranged to cause an identity database of the communication system that is separate from the CS to maintain at least one of first and second registration records, which respectively represent the first and second private identities, to cause the identity database to maintain, simultaneously with the at least one of the first and second registration records, an additional registration record, which represents the common public identity and comprises an identification of the CS as a Visitor Location Register (VLR) of the common public identity, to receive a request to set up a call in which the public identity serves as one of a source and a destination of the call, to query the association stored in the CS in response to the identification of the CS as the VLR of the common public identity by the additional registration record, in order to identify one or more of the private identities that is to participate in the call, and to establish the call between a third communication terminal and one of at least the first and second communication terminals using the registration records of the private identities identified using the queried association.

17. The convergence server according to claim 16, wherein the first communication terminal communicates with a first network conforming to a first communication domain, wherein the second communication terminal communicates with a second network conforming to a second communication domain different from the first communication domain, and wherein the CS is connected to the first and second networks.

18. The convergence server according to claim 17, wherein the processor is arranged to invoke a first service platform in the first network to provide a first call service and to invoke a second service platform in the second network to provide a second call service, the first and second call services associated with the public identity.

19. The convergence server according to claim 16, wherein the processor is arranged to receive an incoming call destined to a subscriber associated with the public identity, to select a terminal from among the first and second communication terminals and to route the incoming call to one of the first and second private identities that is assigned to the selected terminal.

20. The convergence server according to claim 19, wherein the processor is arranged to cause the incoming call to be routed to the selected terminal via the convergence server.

21. The convergence server according to claim 20, wherein the processor is arranged to assign to the received incoming call a first temporary routable number (TRN) associated with the CS in order to cause the incoming call to be routed to the CS.

22. The convergence server according to claim 21, wherein the processor is further arranged to assign to the incoming call routed to the CS a second TRN so as to cause the incoming call to be routed from the CS to the selected terminal.

23. The convergence server according to claim 21, and comprising a redirection proxy arranged to store call contexts, wherein the processor is arranged to cache in the redirection proxy a linkage between the first TRN and the public identity and, when the incoming call routed to the CS does not carry the public identity, to determine the public identity responsively to the cached linkage.

24. The convergence server according to claim 16, wherein the processor is arranged to receive an outgoing call initiated by an initiating terminal comprising one of the first and second communication terminals, the outgoing call addressed to a destination, and to cause the outgoing call to be routed to the destination via the CS.

25. The convergence server according to claim 24, wherein the processor is arranged to replace in the outgoing call a private identity of the initiating terminal with the public identity.

26. The convergence server according to claim 24, wherein the processor is arranged to assign to the received outgoing call a temporary routable number (TRN) associated with the CS, so as to cause the outgoing call to be routed to the CS, and to subsequently route the outgoing call from the CS to the destination.

27. The convergence server according to claim 26, and comprising a redirection proxy arranged to store call contexts, wherein the processor is arranged to cache in the redirection proxy a linkage between the assigned TRN and one of the first and second private identities associated with the initiating terminal, and, when the outgoing call routed to the CS does not carry the private identity of the initiating terminal, to determine the private identity of the initiating terminal responsively to the cached linkage.

28. The convergence server according to claim 16, wherein the processor is arranged to invoke a call service associated with the public identity.

29. The convergence server according to claim 16, wherein the processor is arranged to hand-off the call from the one of the first and second communication terminals to another of the first and second communication terminals.

30. The convergence server according to claim 16, wherein the identity database comprises a Home Location Register (HLR).

31. A communication system, comprising:
at least first and second communication terminals having at least respective first and second private identities;
an identity database; and
a convergence server (CS), which is coupled to assign to at least the first and second communication terminals a common public identity different from at least the first and second private identities, to hold an association between the private identities and the common public identity, to cause the identity database to maintain at least one of first and second registration records, which respectively represent the first and second private identities, to cause the identity database to maintain, simultaneously with the at least one of the first and second registration records, an additional registration record, which represents the common public identity and comprises an identification of the CS as a Visitor Location Register (VLR) of the common public identity, to receive a request to set up a call in which the public identity serves as one of a source and a destination of the call, to query the association stored in the CS in response to the identification of the CS as the VLR of the common public identity by the additional registration record, in order to identify one or more of the private identities that is to participate in the call, and to establish the call between a third communication terminal and one of at least the first and second communication terminals using the registration records of the private identities identified using the queried association.

32. A computer software product for communication, the product comprising a tangible computer-readable medium, in which program instructions are stored, which instructions, when read by a computer, cause the computer to hold an association between at least first and second private identities of at least respective first and second communication terminals and a common public identity different from at least the first and second private identities, to cause an identity database to maintain at least one of first and second registration records, which respectively represent the first and second private identities, to cause the identity database to maintain, simultaneously with the at least one of the first and second registration records, an additional registration record, which represents the common public identity and comprises an identification of the CS as a Visitor Location Register (VLR) of the common public identity, to receive a request to set up a call in which the public identity serves as one of a source and a destination of the call, to query the association stored in the CS in response to the identification of the CS as the VLR of the common public identity by the additional registration record, in order to identify one or more of the private identities that is to participate in the call, and to establish the call between a third communication terminal and one of at least the first and second communication terminals using the registration records of the private identities identified using the queried association.

* * * * *